US012732496B2

(12) United States Patent
Rajshekar et al.

(10) Patent No.: US 12,732,496 B2
(45) Date of Patent: Sep. 8, 2026

(54) SYSTEMS AND METHODS FOR UNIFIED COMMUNICATION PLATFORM FOR SECURE AND SEAMLESS CROSS-CHANNEL INTERACTION

(71) Applicant: Movius Interactive Corporation, Alpharetta, GA (US)

(72) Inventors: Manoj Rajshekar, Duluth, GA (US); Paul Rubenstein, Roswell, GA (US); Amyn Sheriff, Alpharetta, GA (US); Chethan Visweswar, Alpharetta, GA (US)

(73) Assignee: Movius Interactive Corporation, Alpharetta, GA (US)

( * ) Notice: Subject to any disclaimer, the term of this patent is extended or adjusted under 35 U.S.C. 154(b) by 35 days.

(21) Appl. No.: 18/924,959

(22) Filed: Oct. 23, 2024

(65) Prior Publication Data

US 2026/0052143 A1 Feb. 19, 2026

Related U.S. Application Data

(63) Continuation-in-part of application No. 18/809,032, filed on Aug. 19, 2024.

(60) Provisional application No. 63/684,833, filed on Aug. 19, 2024.

(51) Int. Cl.
*H04L 9/40* (2022.01)

(52) U.S. Cl.
CPC .............................. *H04L 63/0838* (2013.01)

(58) Field of Classification Search
CPC .... H04L 63/0838; H04L 63/18; H04L 9/3215
See application file for complete search history.

(56) References Cited

U.S. PATENT DOCUMENTS 8,583,743 B1 * 11/2013 Gailloux ............... H04L 51/066 709/219
11,533,288 B1 * 12/2022 Mascia ................... G06F 21/44
12,328,311 B2 * 6/2025 Jarvis ...................... G06F 21/42
2023/0093143 A1 * 3/2023 Kaidi ...................... G06F 21/31 726/6

* cited by examiner

*Primary Examiner* — Thaddeus J Plecha
(74) *Attorney, Agent, or Firm* — Smith Tempel Blaha LLC; Gregory Scott Smith

(57) ABSTRACT

A Unified Communication Platform (UCP) that enables mobile devices and platforms (as well as applications or programs running thereon) to communicatively interface with each other over various communication channels and provides for authentication of the users involved in the communication session.

9 Claims, 10 Drawing Sheets

SYSTEMS AND METHODS FOR UNIFIED COMMUNICATION PLATFORM FOR SECURE AND SEAMLESS CROSS-CHANNEL INTERACTION

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b). This application claims the benefit of U.S. Provisional Application for Patent 63/684,833 filed on Aug. 19, 2024, and this application is a continuation in part of U.S. patent application Ser. No. 18/809,032 filed on Aug. 19, 2024, both applications are incorporated herein by reference in their entirety.

BACKGROUND

"Didn't you get my message?" That question always seems to invoke a sinking feeling inside. The feeling of "oh no, I have somehow failed in the world of messaging." How is it possible in such a connected world filled with such a wide variety of messaging technology and capabilities that it is ever necessary to ask that question? The answer to this question is easy, we are not really in a "connected world". We claim to be living in a "connected world" but really, it is just a world of connections. As such, we live in a world of disjointed and fractured communications in which party A can direct communicating toward party B over a variety of paths using a variety of technologies but to receive the communication, party B has to be accessible over any of the paths using any of the technologies at all times. And thus the "didn't you get my message" cycle continues.

The free world thrives on the provision of variety. Variety is the field leveler in a competitive world. And in the field of telecommunications, this world has plenty of variety. One would be hard pressed to find a person these days that does not carry a mobile phone. Even the homeless people standing at their most popular intersections can be seen talking on their mobile telephones. IOS or Android based mobile and smart telephones are available from a variety of manufactures such as APPLE, SAMSUNG, LG, MOTOROLA, NOKIA, VIVO, REALME, HUAWEI, ONEPLUS, GOOGLE PIXEL, and others. These smart telephones can be utilized or provisioned from a variety of service providers such as T-MOBILE, VERIZON WIRELESS, XFINITY MOBILE, US MOBILE, CRICKET WIRELESS, MINT MOBILE and others. But the variety does not stop there.

While this plethora of mobile and smart telephones can be serviced by any one or more of the variety of service providers, the smart telephones may employ one or more of a huge variety of communication channels or techniques. These communication channels can include (a) carrier-based or app-based calling applications, texting/SMS applications such as WHATSAPP, MESSENGER, TELEGRAM, SIGNAL, MESSAGE+, GROUPME, KIK and DUST as non-limiting examples, (b) social media based communication channels such as FACEBOOK, INSTAGRAM, WECHAT, TIKTOK, and LINKED IN, as non-limiting examples, (c) video conferencing applications such as ZOOM, MICROSOFT TEAMS, RING CENTRAL, GOTO MEETING, WEBEX, and GOOGLE MEET as non-limiting examples, and third-party web apps running on desktops, mobile apps, etc.

As those skilled in the art will conclude, with the vast number of smart devices, the number of service providers, the number of communication channels combined with different communication needs and habits of the users, it is easy to see why the "didn't you get my message?" question is so frequently presented.

What is needed in the art is a solution that can take this communication bowl of spaghetti and somehow tie it all together into a single package in which users can easily communicate with each other over this ever growing and expanding network of ions. The embodiments of the present invention as presented herein, along with equivalents thereof provide a solution to this need in the art.

BRIEF SUMMARY

A Unified Communication Platform (UCP) that enables mobile devices and platforms (as well as applications or programs running thereon) to communicatively interface with each other over various communication channels and provides for authentication of the users involved in the communication session.

One embodiment entails providing authentication for communication across multiple channel types. This is provided by first receiving a one-time password (OTP) from a first user seeking to authenticate with a second user. The OTP is received by a multi-channel authenticator splitter (MCAS) and the OTP comprising a message content, a sending channel identification and a receiving channel identification.

The MCAS operates to split the OPT and transmit the portions of the OTP across a sequence of channels to the second user. In some embodiments the MCAS receives a specified sequence of channels from the first user, uses a randomizer to choose the sequence of channels, and/or receives a subset of channels from the first user.

The second user assembles the received portions of the OTP and assembles to obtain the complete OTP. Further, the second user, in response to obtaining the complete OTP and assembling it, sends a response to a Multi-Channel Authentication Validator (MCAV) to validate the OTP.

Upon validation by the MCAV, a unified communication platform (UCP), communicatively coupled to the MCAS and MCAV then establishes a communication channel between the first user and the second user. Next, after establishing the communication channel, the UCP, in response to receiving a communication transmission from the first user to the second user, performs any conversion necessary for the second user to understand the communication transmission from the first user. Similarly, in response to receiving a communication transmission from the second user to the first user, the UCP performs any conversion necessary for the first user to understand the communication transmission from the second user. Further, the UCP routes the translated communication transmissions between the first user and the second user.

In some embodiments, the UCP parses the received communication and recognizes if the communication is one that is serviced by the UCP. Further, in some embodiments, the action of the UCP establishing a communication channel between the first user and the second user comprises establishing a first leg of the communication channel between the UCP and the second user and establishing a second leg of the communication channel between the UCP and the first user. Further, the action of establishing the first leg of the communication channel between the UCP and the second user comprises using a telecommunications technology compatible with the second user. Similarly, the action establishing the second leg of the communication channel between the UCP and the first user comprises using a telecommunications technology compatible with the first user. In some embodiments, the UCP may enter the communication transmission into an archive for a user associated with the originating entity.

DETAILED DESCRIPTION OF VARIOUS EMBODIMENTS

Figure 1:
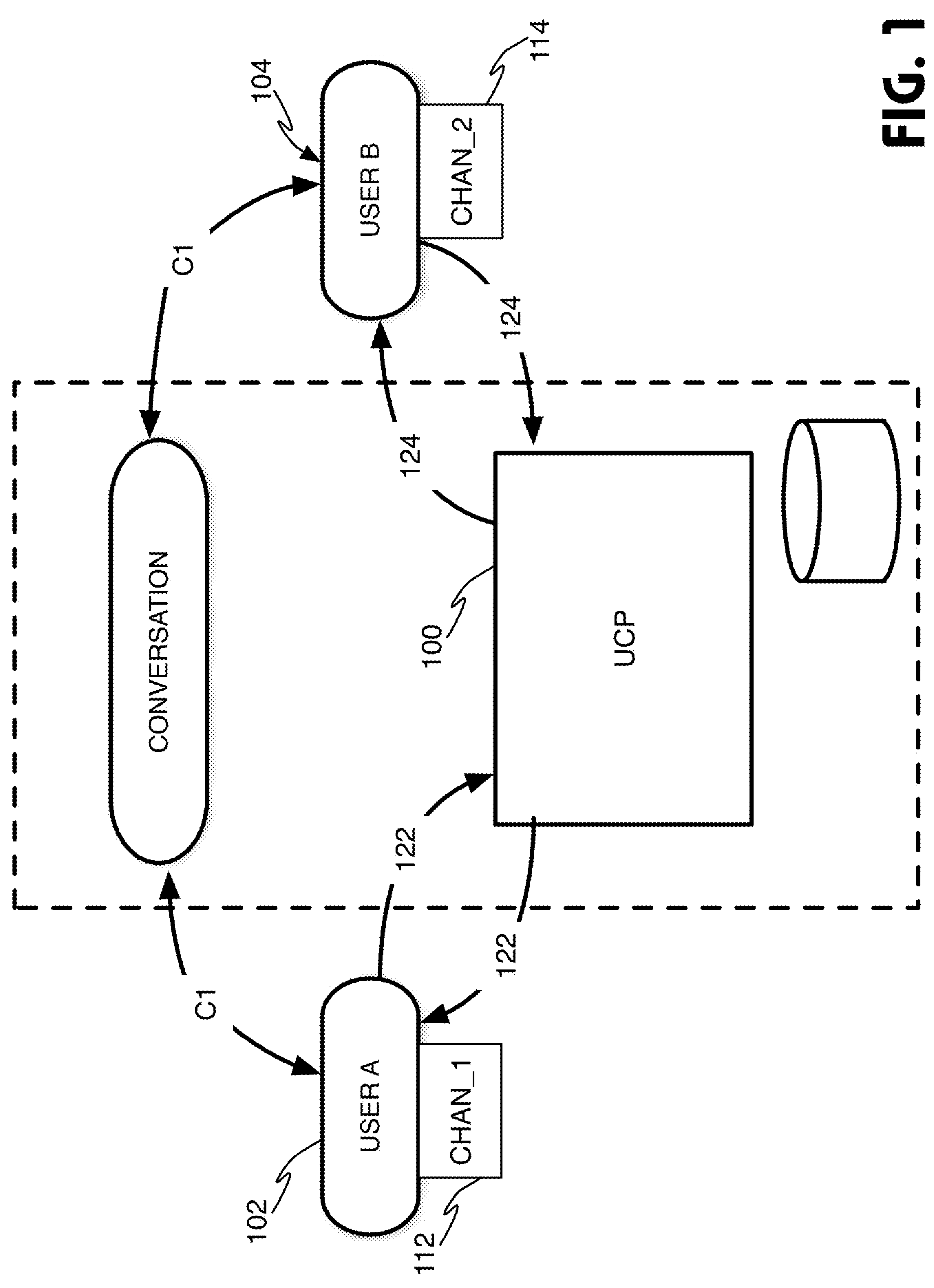
FIG. 1 is a block diagram illustrating an exemplary functional structure for enabling conversations between users that are using different channels.

The present invention, as well as features and aspects thereof, is directed towards a Unified Communication Platform (UCP) that enables mobile devices and platforms (as well as applications or programs running thereon) to communicatively interface with each other over various communication channels and provides for authentication of the users involved in the communication session.

The word "exemplary" is used herein to mean "serving as an example, instance, or illustration." Any aspect described herein as "exemplary" is not necessarily to be construed as preferred or advantageous over other aspects.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "telecommunications device," "communication device," "wireless device," "wireless telephone," "wireless communication device" and "wireless handset" are used interchangeably. With the advent of third generation ("3G"), fourth generation ("4G"), fifth generation ("5G"), and beyond wireless technology, greater bandwidth availability has enabled more portable computing devices with a greater variety of wireless capabilities. Therefore, a telecommunications device ("TD") may include a cellular telephone, a pager, a PDA, a smartphone, a navigation device, a tablet personal computer ("PC"), a hand-held computer with a wireless connection or link, a watch, a chip embedded within an individual and integrated within the brain, nervous system and muscular system, etc.

In this description, the terms "call" and "communication," in their noun forms, envision any data transmission routed across a network from one device to another including, but not limited to, a voice transmission, a text message, a video message, a page, a data transmission, etc.

Turning now to the figures in which like elements are represented by similar labels, various embodiments, as well as aspects, features and characteristics of the embodiments are presented in more detail.

The heart of today's telecommunication industry is found in wireless based networks serving as the integration of mobile and wireless devices into the historical public switched network technology ("PSTN"). However, the use of the PSTN to reach into homes and businesses has been greatly replaced using wireless technology, while the backbone of the PSTN is still in use. But wireless and mobile networks are quite varied and exist in a variety of telecommunications technologies, such as 3G, 4G, 5G, LTE, GSM, etc., as well as other wireless technology including WIFI, BLUETOOTH, INFRARED, BROADCAST RADIO, MICROWAVE, and even satellite technologies. Each of these technologies have similarities and differences.

A goal or object of the various embodiments of the present invention is to provide a technique, technology, solution, methodology, etc. that enables the widest array of end user devices to communicate with other end user devices and provide compatibility no matter what protocol or technology being utilized. Throughout this description, the term end user device is used to refer to any element that can originate and/or receive a communication. Thus, as non-limiting examples, end user devices (sometimes referred to herein as EUDs) may be mobile telephones, smart phones, tablets, note pads, IPADS, notebook computers, desktop computers, personal data assistants, POTS devices, applications running on any of the afore mentioned devices such as messaging applications, video conference applications, voice messaging applications, financial transaction devices, point of sale terminals, CRM applications, social media applications, PBXs, archival applications, enterprise collaboration applications, healthcare integrations, etc. As such, a EUD may be an application running on a mobile telephone, or it may be a hardware enablement of a mobile telephone, etc.

INTRODUCTION AND BACKGROUND

The Mobile Unified Communication Platform (herein after referred to as "UCP") is a revolutionary communication hub that integrates multiple communication channels into a single, user-friendly interface. The UCP also operates as a secure interoperable communications capture and archival system for enterprises. The UCP enables seamless communication across various platforms and channels, including voice and video calls, messaging apps, social media, and more.

In general, the various embodiments of the UCP may include at least some of the following features: Omnichannel Interface; Omni Device support; Unified Inbox; Smart Routing; Enhanced Security; AI-Powered Chatbots; Analytics and Insights; and Scalability and Flexibility. Each of these features are described herein and/or related applications in greater detail.

As the name implies, the Omnichannel Interface allows communication to be transmitted and/or received over any available channel. A user may have a favorite application that is desired to be used for sending and receiving messages. The user may wish to spend any communication engagement time within that favorite application without having to switch to different applications to see if the user has received a message from a party using that channel. The Omnichannel Interface allows the user to send messages to another through any channel but still enable the user to utilize his or her favorite application. Likewise, the Omnichannel Interface allows the user to receive messages from other parties that transmitted the messages using a different application from the user's favorite application. As such, the UCP combines multiple communication channels such as: voice and video calls; SMS and MMS; social media platforms (FACEBOOK, INSTAGRAM, LINKEDIN, TINDER, etc.); messaging apps (WHATSAPP, SIGNAL, TELEGRAM, etc.); enterprise collaboration channels such as MS TEAMS, SLACK, ZOOM; CRM systems such as SALESFORECE, SERVICENO, ZENDESK; email; and video conferencing such that messages received over one channel can be directed to a destination over a different channel.

Similarly, the various embodiments may provide Omni Device support. The Omnichannel interfaces would operate on or the UCP can interact with on heterogeneous devices such as SmartPhones, Tablets, Connected Laptops, Desktops, Smart TVs, Smart Kiosks, iOT devices which would have computer, network connectivity such as wireless protocols, SIM, eSIM, and/or Satellite connectivity.

In some situations, a user may have and utilize multiple applications. For instance, the user may utilize LINKEDIN to communicate with potential clients or to conduct business development but use WHATSAPP to communicate confidential information with existing clients. It may be desirable for the user to be able to access all such communications in a single place, which is referred to in the various embodiments as a Unified Inbox. Utilizing the Unified Inbox, the user can receive and manage all messages, calls, and notifications in a single inbox, eliminating the need to switch between apps.

To implement some of the afore mentioned features, the UCP implements Smart Routing. This feature operates to automatically route incoming messages and calls to or through the most suitable channel, ensuring efficient communication. Thus, if a user identifies a particular application as being the application of choice, the UCP will direct communications over a channel for that application. Further, the user may specify suitable channels for different types of messages. For instance, voice calls may be directed to one application while SMS messages may be directed to another. Further, messages from contacts in a certain class or category may be directed to an application that is different for contacts in a different class or category. It will be appreciated that may factors may be utilized for filtering and directing messages, such as time of day, subject matter, day of the week, location of recipient, etc.

In implementing the capabilities of the UCP, privacy and security of the users are not compromised. The UCP provides Enhanced Security by implementing end-to-end encryption, two-factor authentication, and granular access controls to safeguard user data.

Utilization of technology, such as the UCP, is highly dependent upon the usability of the technology. Users have grown to expect intuitive user interfaces without the need for complicated user manuals, training and added IT support. The embodiments of the UCP may be equipped with AI-Powered Chatbots. The AI-driven chatbots enable automated customer support, lead generation, and personalized engagement for users utilizing the UCP.

The various embodiments of the UCP can dynamically analyze and provide feedback to users to improve the usability of the system. As such, the UCP obtains Analytics and Insights. Real-time analytics and actionable insights are used to optimize communication strategies and user engagement.

The various embodiments of the UCP provide Scalability and Flexibility. The various embodiments operate to support businesses of all sizes, with customizable workflows and integrations with existing systems.

Advantageously, the various embodiments of the UCP operate to provide multiple benefits. For instance, one such benefit is the provision of streamlined communication. The various embodiments of the UCP may provide streamlined communication by simplifying communication through the consolidation of multiple, or even all possible channels in some embodiments, into a single platform that can direct communication in accordance with user desires and/or a variety of parameters. In essence, the UCP takes multiple disjointed channels and unifies them together such that users can send and receive communications over their preferred channels.

Another benefit provided by embodiments of the UCP is an increase in productivity. The UCP reduces, and in some cases completely eliminates switching costs (meaning the time lost for users to switch between various applications and channels) and enables users to respond quickly and efficiently.

The various embodiments of the UCP provide an enhanced customer experience. This is accomplished by providing a unified and personalized experience across all communication channels. Further, the various embodiments of the UCP offer an improved security by providing an environment in which robust security features can be implemented and thereby protecting user data and providing a high-level of trust.

The various embodiments of the UCP can be utilized by businesses as well as individuals. For business users, the UCP advantageously enhances customer engagement, streamlines communication, and boosts productivity. For individuals, the UCP advantageously simplifies personal and professional communication, and enables the enjoyment of a unified experience across all channels.

Various embodiments of the UCP also provide compliance and regulation. The embodiments include the capability to collect and record all communications between representatives of an enterprise and its customers and provides one-to-one or group conversation between individuals with common interests for compliance purposes. By harnessing the power of the UCP, users can experience a seamless and efficient communication experience, unlocking new possibilities for connection and collaboration.

Further understanding of the structure, operation, features and advantages of the UCP are illustrated by various use cases.

Use Case—Conversations Between Users that Come from Different Channels, Wherein the Channels are Integrated into the UCP.

FIG. 1 is a block diagram illustrating an exemplary functional structure for enabling conversations between users that are using different channels. The illustration in FIG. 1 is that of User A 102 initiating a new communication connection with User B 104 or continuing to use an existing conversation or connection which is referred to as Conversation C1.

In the illustrated example, User A 102 is utilizing channel type CHAN_1 112 as its communication channel to establish or provide a communication to User B 104. User B 104 is illustrated as using channel type CHAN_2 114. User A 102 could be using any of a variety of channel types but for purposes of illustration, User A 102 is shown at utilizing CHAN_1 112. User A 102 authenticates using CHAN_1 112 authentication protocols and establishes a connection 122 with the UCP 100. The authentication is accomplished using security tokens needed to identify and authenticate in the UCP 100.

Upon User A 102 successfully authenticating with the UCP 100, the UCP 100 can receive a connection request over connection 122. The connection request identifies a request to connect with User B 104. The UCP 100 then can initiate a connection with User B 104 over connection 122.

In response to receiving a communication request, User B authenticates using CHAN_2 114 authentication protocols and establishes a connection 124 with the UCP 100. The authentication is accomplished using security tokens needed to identify and authenticate in the UCP 100.

Once User B 104 is authenticated, User B 104 joins conversation C1 using CHAN_2 114 and User A 102 joins conversation C1 using CHAN_1 112. As a more particular non-limiting example, in one case, User A 102, the initiator, may be the owner of a business and User B 104 could be an Enterprise user communicating customer service, or both could be enterprise users or both could be consumers.

Communication could be established as part of conversation C1, where messages could be text messages, supporting any digital multi-media content, and conversations could traverse into other modalities beyond text to voice or video. It will be appreciated that while the illustrated example was for a one-to-one communication, the various embodiments can handle many-to-one, one-to-many, and many-to-many as well.

Use Case—Group Conversations Between Users that Come from Different Channels, Wherein the Channels are Integrated into the UCP.

Figure 2:
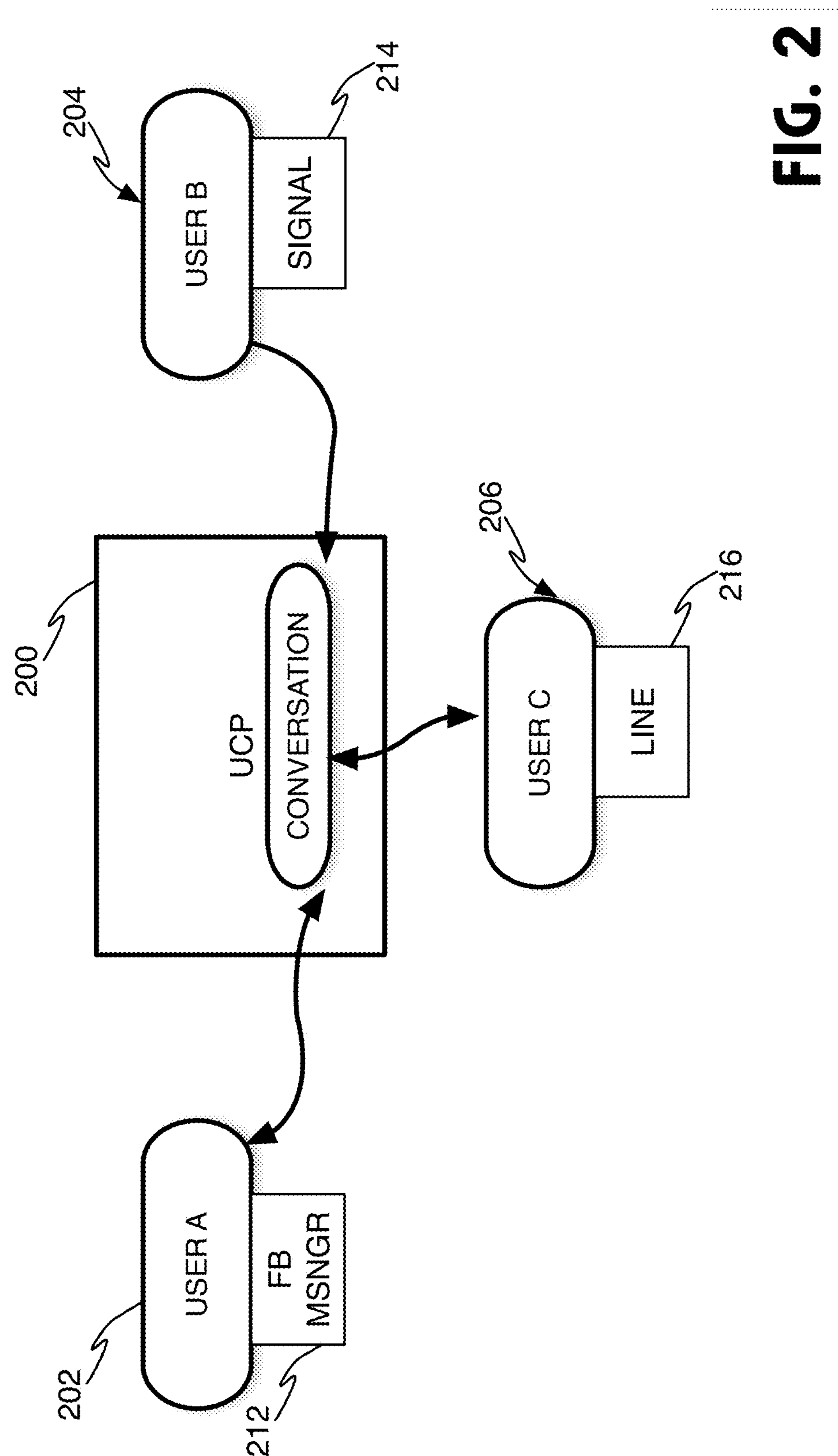
FIG. 2 is a block diagram illustrating a more specific example of the use case illustrated in FIG. 1 illustrating the provision of a group conversation between multiple users that may be utilizing different channels that are integrated into the UCP.

FIG. 2 is a block diagram illustrating a more specific example of the use case illustrated in FIG. 1 illustrating the provision of a group conversation between multiple users that may be utilizing different channels that are integrated into the UCP.

For example, User A 202, User B 204 and User C 206 are illustrated as entering into a group conversation and utilizing different channel identities and channel handles from each other. Users having different channel identities and channel handles would join after authenticating with the UCP 200 and establishing a common group conversation. User A 202 is illustrated as authenticating using FACEBOOK MESSENGER authentication protocols 212 and establishes a connection with the UCP 200 using security tokens needed to identify and authenticate in the UCP 200 and to initiate an existing or new conversation. User B 204 authenticates using SIGNAL authentication protocols and establishes a connection with the UCP 200 using security tokens needed to identify and authenticate in the UCP 200. Once authenticated, User B 204 would join the conversation using a SIGNAL channel 214. User C206 authenticates using LINE channel 216 authentication protocols and establishes a connection with the UCP 200 using security tokens needed to identify and authenticate in the UCP 200. Once authenticated, User C 206 would join the conversation using a Line channel 216. The communication would be established as part of the conversation where messages could be text messages, supporting any digital multi-media content, and conversations could traverse into other modalities beyond text to voice or video.

Use Case—Multichannel Integration as Multichannel Authentication (MCA) to Authenticate for Different Workflows and Communication.

Figure 3:
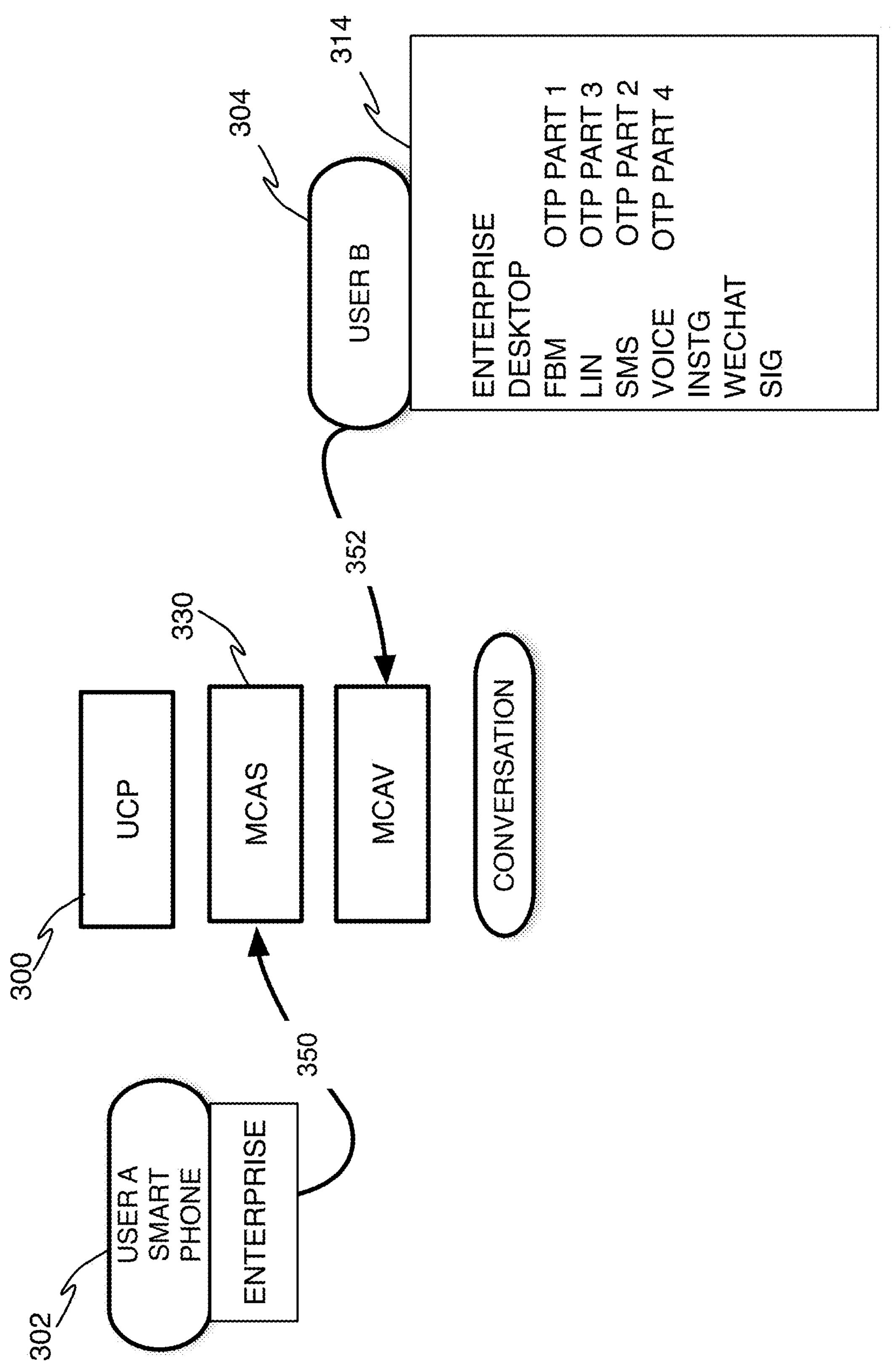
FIG. 3 is a block diagram illustrating multichannel integration as multichannel authentication to authenticate for different workflows and communication.

FIG. 3 is a block diagram illustrating multichannel integration as multichannel authentication to authenticate for different workflows and communication. In the illustrated example, User A 302 belongs to an enterprise 312 and connects to the UCP 300 using one of the approved identities and integrated channels. To start a conversation with User B 304, User A 302 needs to authenticate and get approval from User B 304 for a specific workflow. As illustrated, User B 304 has multiple handles 314 (i.e. FB MESSENGER, INSTAGRAM, WECHAT, SIGNAL, LINKEDIN, SMS, Voice). Each of the handles are registered into the UCP 300. Thus, User A 302 sends a one-time password (OTP) 350 to the multichannel authentication (MCA) splitter.

The importance of safe, user-friendly user authentication has become increasingly important for organizations of all sizes. While password-based authentication has long been a standard method, evolving threats and user friction have led to the consideration of alternative options. One notable solution that has gained prominence is what is utilized in the present embodiments-one-time password (OTP) authentication.

An OTP is a dynamically generated set of numbers or letters designed to grant users one-time access to an application. Unlike traditional passwords, OTPs aren't static and change every time a user attempts to log in. An OTP is sometimes called a one-time PIN, one-time passcode, or one-time authorization code (OTAC).

OTPs can be sent to users via SMS, email, messaging services like WhatsApp, or mobile push notifications. Alternatively, OTP generators such as hardware keys and mobile authenticator apps can be used for authentication. One-time passcodes are often a secondary factor in a multi-factor authentication (MFA) flow.

There are two primary types of OTPs, each offering unique advantages and use cases: Time-based OTP (TOTP) and HMAC-based OTP (HOTP). OTP generation algorithms generally receive two inputs that are used to generate OTP codes:

(1) A seed—this static secret key is shared between the token and the server. It is created when a new account is established on the authentication server.

(2) A moving factor—this is a component that changes every time a new OTP is requested. The main difference between HOTP and TOTP is how the moving factor is generated.

The "H" in HOTP stands for Hash-Based Message Authentication Code (HMAC). Thus, HOTP stands for HMAC-Based One-Time Password. In HOTP, the moving factor is a counter incremented every time a new OTP is requested. This counter is stored on both the token and the server. The counter on the token increments by one when a new OTP is requested. The counter on the server increments by one when an OTP is successfully validated.

HOTP tends to be user-friendly since it doesn't increment until the user requests a new OTP, making it suitable for scenarios where time synchronization might be a challenge. This means the user has ample time to enter the OTP. However, this also makes HOTP more susceptible to brute-force attacks.

TOTP stands for Time-based One-time Password. TOTP's moving factor is based on time rather than incremental counters. The OTP changes after a specified period of time called a timestep, which is usually between 30 to 90 seconds.

TOTP is generally more secure than HOTP and tough to crack with brute force attacks. However, the user has to input the passcode before it refreshes, which introduces the possibility of time drift. To cope with this, the authenticating server must make it easy for users to input a new OTP if the previous one expires.

Returning to FIG. 3, the OTP 350 sent by User A 302 can be in the following format:

| TEXT/VOICE | SENDING CHANNEL | RECEIVING CHANNEL |
|---|---|---|

For example, the OTP 350 could be structured as follows:

| MESSAGE | ENTERPRISE | FB MESSENGER |
|---|---|---|

User A's 302 action of sending the OTP 350 causes a trigger of the multi-channel authenticator splitter (MCAS) 330 which then operates to split the OTP across different channels for User B 304. Upon reception by User B 304, User B 304 would need to assemble the complete OTP from the sequence of channels which User A would have specified.

User A 302 could split for a specific sequence of channels, allow the MCAS 330 randomizer to choose the sequence of channels, or even choose a subset of channels for authentication purposes. For User B 304 to validate and authenticate, the response 352 from User B 304 would reach the mobile authenticator validator (MCAV) 340 to validate against the request from MCAS 330.

To complete authentication the MCAS 330 and the MCAV 340 can run at the edge (device of the user) or reside on the server and interface with interfaces such as mobile apps, web apps, etc.

Use Case—Video Communication Modality from Different Native Communication Channels.

Embodiments of the UCP provive for interoperable group conversations with video calling. More particularly, the UCP enables users from diverse social media channels to converge into a single, cohesive group conversation. This innovative feature allows users to connect with others across different platforms, fostering a collaborative and inclusive environment.

For example, the various embodiments may include multi-platform convergence. With this capability, users from various social media channels, such as FACEBOOK, INSTAGRAM, LINKEDIN, WHATSAPP, etc., can join into a single group conversation. Thus, a user of FACEBOOK can seamlessly be involved in a group conversation with others on FACEBOOK or any of the other listed communication applications or others.

Another advantage is that the various embodiments may exchange messages, files, and media with others in the group, regardless of their original platform. Further, with respect to video calling, the various embodiments my initiate high-quality video calls with individuals or groups, transcending platform boundaries. In addition, the various embodiments may include real-time translation. The automatic language translation enables users to communicate effectively, despite language barriers.

As an example, suppose a marketing team consists of members from different departments with each member using their preferred social media platform. Thus, the team maybe attempting to communicate from various platforms. With UCP and the unified profile identifier, the team members can create a combined group conversation, incorporating team members from FACEBOOK, LINKEDIN, WHATSAPP, etc. The team members can share files, discuss projects, and initiate video calls, all within a single interface, regardless of their native platform.

Use Case—Switching Specific Conversations for a User Across Different Channels Through UCP.

Various embodiments of the UCP may provide dynamic channel switching for a registered user in UCP. Within the UCP, users in a group conversation can effortlessly switch between different channels they are registered on without disrupting the conversation. This feature enables users to adapt their communication channel to suit their needs, preferences, or circumstances, all in real-time.

In operation, User A's user profile attributes in UCP with have all the registered channels (inclusive of email, phone number, physical coordinates as non-limiting examples) as attributes for the user. During a group conversation, as the UCP aggregates all the communication happening with a user, the user can decide to switch to a specific channel for various workflow purposes. Advantageously, this aspect of various embodiment of the UCP gives capabilities at the user level for UserA to perform the following function or receive the following service:

- Channel Selection: During a group conversation, users can select (or an app that is being used may select the channel that is best suited for the communication type) a new channel from their registered platforms (e.g., from FACEBOOK to WHATSAPP or from LINKEDIN to SIGNAL, etc.);
- Seamless Handover: The intelligent routing system of the UCP ensures a seamless transition, maintaining the conversation's continuity and context;
- Channel-Specific Features: Users can leverage the unique features of their chosen channel, such as end-to-end encryption on SIGNAL or file sharing on WHATSAPP as non-limiting examples; and
- Real-time Updates: The conversation updates in real-time, reflecting the user's new channel selection, ensuring all participants are aware of the change.

Advantageously, this aspect of the UCP provides flexibility, contextual communication, enhanced privacy, streamlined communication, and automatic update with other channels in conversation. As for flexibility, the users are able to adapt their communication channel to suit their needs, preferences, or circumstances-all in real-time without interrupting the conversation. For contextual communication, the users are able to leverage the strengths of different channels to enhance the conversation. For instance, the user may utilize WHATSAPP for file sharing but switching to LINKE- DIN for professional discussions. The privacy is enhanced by allowing users to switch to a more private channel, like SIGNAL, for sensitive of confidential discussions. Communication is streamlined by eliminating the need to start a new conversation or switch between applications. Thus, communication is simplified, and productivity can be increased. In addition, other channels can be updated with the conversation changes to maintain records in each application if the users so desire.

As a non-limiting example, during a group conversation, User A may need or desire to share a confidential document with User B. Besides splitting the OTP using the splitter and validator as part of the UCP, the users switch from FACEBOOK to SIGNAL, leveraging its end-to-end encryption, and share the document securely. The conversation continues uninterrupted, with both/all users aware of the channel change. Later, the user switches back to FACEBOOK to share a related news article, demonstrating the flexibility and adaptability of UCP's dynamic channel switching feature.

Use Case—Promoting Communication Channels from Different Communication Modalities Such as Audio of a Specific Channel and Switch to Video from a Different Channel Identity for the Same User and Continue to See the History for that Conversation (this Also Plays a Significant Role in Compliance and Regulations)

On capability of the UCP is facilitating a unified communication history for compliance and regulatory purposes. In operation, the UCP stores all communication history, including messages, files, voice and video calls, and other interactions, in a secure and centralized repository. The repository could be distributed across the server or the edge or any of the combinations based on business use cases. This ensures that users can access their complete communication history, regardless of the channel or device used.

More particularly, the UCP synchronizes communication history across all channels, including social media platforms, messaging apps, and voice and video calling platforms. As such, as non-limiting examples, messages sent on FACEBOOK are also visible on WHATSAPP and other connected channels. Also, files shared on LINKEDIN are accessible on SIGNAL and other connected channels. Further, voice and video call history is synchronized across all channels.

In addition, the UCP synchronizes communication history across multiple devices, including:

- Desktop computers;
- Laptops;
- Mobile phones;
- Tablets;
- Smart TVs & Kiosks;
- IOT devices which would have an underlying presentation layer as well as other devices not listed.

Advantageously, this aspect of various embodiments of the UCP enables users to have access to their complete communication history, regardless of the device that they used over the course of the history.

The various embodiments of the UCP may operate to store communication history in a secure, encrypted, and compliant storage solution, ensuring that user data is protected from unauthorized access. Such storage solutions may be designed to meet the highest security standards, including:

- End-to-end encryption;
- Multi-factor authentication;
- Regular security updates and patches;
- Compliance with major data protection regulations; and other standards.

As a more detailed but non-limiting example, the following tables illustrate some of these afore-mentioned aspects that may be included in various embodiments of the UCP.

Assume that User A is registered on the channels that are listed in Table 1 below as a non-limiting example, and also onboarded on the UCP.

TABLE 1

| Registered on Channel |
|---|
| FACEBOOK |
| LINKEDIN |
| SIGNAL |
| Movius Web App desktop |
| Movius Mobile App (Android and iOS) |

Also, assume that User A has access to utilize the following devices listed in Table 2, as a non-limiting example, for carrying out communications for User A.

TABLE 2

| User A Devices |
|---|
| Desktop computer running Windows |
| Laptop computer (Mac) |
| Mobile telephone (Andriod) |
| Tablet (iPad running iOS) |

In operation, the UCP may record the communication history presented in Table 3, as a non-limiting example.

TABLE 3

| Communication History | | |
|---|---|---|
| Event | Channel | Message/ Description |
| User A sends a message to User B | FACEBOOK | Hey, let's meet up for coffee? |
| User A shares file with User B | LINKEDIN | Q2 Sales Report.pdf |
| User A voice call to User C | WHATSAPP | 10-minute call |
| User A sends a message to User D | SIGNAL | Hi, how's it going? |
| User A receives a message from User E | MOVIUS Web App (Desktop) | Let's schedule a meeting for next week |

In performing the synchronization process available in any of the various embodiments, the UCP may operate to perform the synchronizations presented in Table 4, as a non-limited example.

TABLE 4

| Synchronized History | | | |
|---|---|---|---|
| Event | Channel | Message/ Description | Synchron. On |
| User A sends a message to User B | FACEBOOK | Hey, let's meet up for coffee? | WHATSAPP, LINKEDIN, and Movius Web App (desktop) |
| User A shares file with User B | LINKEDIN | Q2 Sales Report.pdf | Movius Web App (desktop) and Movius App (Android and iOS) |
| User A voice call to User C | WHATSAPP | 10-minute call | Movius Web App (desktop) and Movius |

TABLE 4-continued

| Synchronized History | | | |
| --- | --- | --- | --- |
| Event | Channel | Message/ Description | Synchron. On |
| User A sends a message to User D | SIGNAL | Hi, how's it going? | App (Android and iOS) Movius Web App (desktop) and Movius App (Android and iOS) |
| User A receives a message from User E | MOVIUS Web App (Desktop) | Let's schedule a meeting for next week | FACEBOOK, WHATSAPP, LINKEDIN and Movius App (Android and iOS) |

As a result of the operations provided by the UCP, User A can access the complete communication history, including messages, files, voice and video calls, and other interactions, from any device and any channel. For instance, as non-limiting examples, User A can:

- View conversation with UserB on FACEBOOK, WHATSAPP, or Movius Web App (desktop) or Mobile App (Android and iOS);
- Access the file shared with User B on LINKEDIN, Movius Web App (desktop), or Mobile App (Android and iOS);
- Review User A's voice call with User C on WHATSAPP, Movius Web App (desktop), or Movius Mobile App (Android and iOS);
- Read message from User D on SIGNAL, Movius Web App (desktop), or Mobile App (Android and iOS); and
- Respond to User E's message on Movius Web App (desktop), FACEBOOK, WHATSAPP, or Movius Mobile App (Android and iOS).

Figure 4:
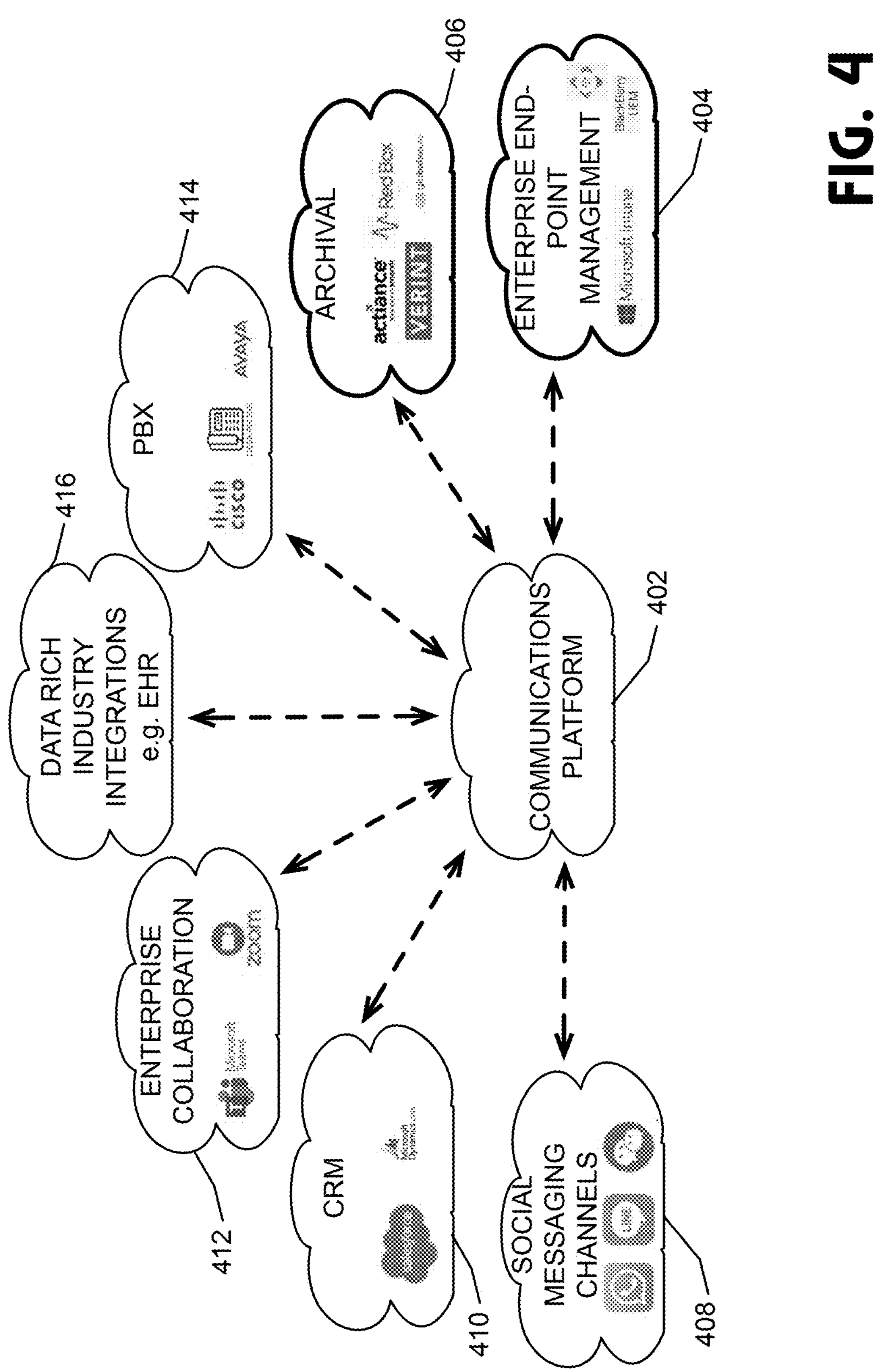
FIG. 4 is a functional diagram illustrating the telecommunications integration goal of various embodiments of the present invention.

FIG. 4 is a functional diagram illustrating the telecommunications integration goal of various embodiments of the present invention. The listing of various communication sources, sinks, participants, etc., should not be viewed as comprehensive but rather as illustrative of the versatility of the various embodiments.

At the core of the integrated telecommunications illustrated in FIG. 4 (the UCP or communications platform 402) is the traditional voice and SMS (short message service) or MMS (Multimedia Messaging Service). However, in addition to those two fundamental channels of communication (reference 402), the disruption of the various embodiments of the present invention may also bring together, from left to right:

(1) Multiple social messaging channels 408, such as WHATSAPP, WECHAT, LINE (as non-limiting examples) all tied to this single unique number and without needing separate application interfaces OR separate identifiers;

(2) CRM cloud 410 illustrates the extension of the ability to receive or send calls and messages (include SMS, MMS, Social Messaging) within a multitude of CRM (Customer Relationship Management) systems without needing separate phone numbers or identities;

(3) Enterprise collaboration cloud 412 illustrates the extension of the ability for the users to be able to use the same phone number or identity within Unified Communication solutions (like MS Teams or Zoom or Cisco Webex or others) such that users can now spend their time productively without switching interfaces to connect with different people in their preferred ecosystems;

(4) PBX cloud 414 illustrates the seamless integration with PBX (Private Branch Exchange) systems eliminating the need for multiple phone numbers and multiple islands of communication (Fixed vs. Mobile); and (5) Last but certainly not the least, security is preserved at each endpoint, at each interface and at each interaction with seamless integrations into Enterprise Mobility Management Solutions—404.

All of these above-described interactions can then be seamlessly integrated and ingested contextually and tied to that single unique identifier into the applicable System of Records systems like: Electronic Health Records (E H R) systems in health care 416; and a multitude of archival platforms used in several commercial and defense systems 406.

If we take a step back, and envision this disruption, this single number (identity) traversing multiple disparate communication islands and technologies would become the holy grail of simplification (as opposed to increasing the complexity), unification (as opposed to fragmentation), data amalgamation (as opposed to data silos), accessibility of information (as opposed to context switching from technology to technology) and bringing the notion of the identity tied to a position in a business not a specific individual, and that identity can be transferred seamlessly (people change, positions remain). All of this is achieved without creating a telecommunication standard or network specific solution.

A communications platform 402 is illustrated as being the central agent for enabling cross-communication among various sources, sinks, participants and technologies. The communications platform 102 may be an artificial intelligence (AI) powered, purpose driven, secure communications platform. The communications platform 402 can operate in a personal domain, an enterprise or business domain, or a hybrid of the two. Within the personal domain, the communications platform 402 seamlessly integrates the communications activity of a user including activities such as social media posts, social messaging channels, calendar activities, household management activities such as notifications from connected houses (i.e., ALEXA, SIRI, GO GOOGLE, SAMSUNG SMART THINGS, etc.), family schedules, school notifications, etc.

Within the business domain, the communications platform 402 seamlessly integrates into enterprise workflows and SaaS apps.

A workflow is a system for managing repetitive processes and tasks which occur in a particular order. They are the mechanism by which people and enterprises accomplish their work, whether manufacturing a product, providing a service, processing information or any other value-generating activity.

Within business process management, a workflow can be defined as a simple series of individual tasks, while a business process is considered more complex, consisting of multiple workflows, information systems, data, people and their activity patterns. A workflow is distinguished by its simplicity and repeatability, and it is generally visualized with diagram or checklist.

Workflow management software assists in simplifying and optimizing a business process within an organization. It largely does this by coordinating interactions among different stakeholders or between individuals and information systems. Workflow management systems route tasks to the appropriate employee at the right time, providing the pertinent information and nudge to expedite work along the overall process. It also supports manual and automated tasks through document management for activities, like expense reports.

Saas (Software As A Service) is a form of cloud computing in which the provider offers the use of application software to a client and manages all the physical and software resources used by the application. The distinguishing feature of SaaS compared to other software delivery models is that it separates the possession and ownership of software from its use.

As such, the communications platform 402 operates to tie in a wide variety of business activities that operate in the realm of workflows and SaaS. For instance, one such activity includes enterprise end-point management 404. Examples of this activity include Microsoft Intune, which is a cloud-based unified endpoint management service for both corporate and BYOD devices. It extends some of the "on-premises" functionality of Microsoft Endpoint Configuration Manager to the Microsoft Azure cloud. Another example includes the BlackBerry UEM, which delivers complete, unified endpoint management and policy control for a company's diverse and growing fleet of devices and apps. The BlackBerry UEM includes a single management console and trusted end-to-end security model. The BlackBerry UEM is designed to help increase the productivity of a company's mobile workforce while ensuring the full protection of the company's business data.

The communications platform 402 also facilitates archive integration 406. The communications platform 402 enables cloud-based recording of communications and data. The communications platform 102 enables the cloud-based recording to be accessed by any EUD and thus, provides compliance, gap-free recording of messages regardless of the location of the EUD. This capability also allows the EUD to transfer recorded communications and data to preferred archival solutions for long-term retention and to have a level of confidence in the securement, retention and accuracy of recorded communications and messaging data. Advantageously, this capability simplifies the supervision, analysis, reporting and eDiscovery of the communications and data. Recordings, files, message streams, etc. can be automatically uploaded to any archival solution from any EUD utilizing the communications platform. Archival solutions may include DUBBER, VERINT, GLOBAL RELAY, VERBA, NICE, SOTERIA, REDBOX, ACTIANCE, AND SPLUNK, as non-limiting examples.

The communications platform 402 also facilitates the consolidation of business mobile messaging channels 408. Messages can be exchanged with consumers on multiple platforms, texting and social messaging, including WHATSAPP, WECHAT, and LINE etc. in a seamless and integrated manner. Advantageously, EUD can thus communicate with any customer over any of the messaging channels without requiring the customer to adapt to the messaging channel of the EUD and also giving the EUD the freedom to utilize a preferred messaging channel. Further, this aspect of the communications platform 102, regardless of if the EUD is an enterprise device or a BYOD, provides more ways in which clients can keep in touch, maintains professionalism by enabling messaging using official business accounts, and avoids the hassle, expense and time waste of utilizing multiple EUDs.

It should be appreciated that the communications platform 402 also facilitates a cross-blend or combination of the various integrations. For instance, consolidating mobile messaging channels 408 also is integrated with the recordation of messages and the archiving of the same 406. Message recording includes messages, picture messaging, group messaging, and automated messages, such as opt-ins. For instance, an opt-in asks for and captures consent send messages from your business. Opt-in and texting disclaimers can be generated and delivered according to local requirements. In addition, redaction, the action of automatically preventing prohibited terms or information from being shared over messages or stored in your archives can also be integrated across the various channels and EUDs.

Along the same lines, many companies still employ the utilization of PBX systems for inter and extra company communications. This is especially true for work forces that do not have to be on the go but rather are able to be positioned at their stations, desks or offices. The communications platform 402 facilitates the consolidation of business messaging and communication channels through the use of PBX systems 414. Thus, state of the art PBX systems such as CISCO and AVAYA, as non-limiting examples, are seamlessly integrated by means of the communications platform 402.

Advantageously, the communications platform 402 provides seamless mobility in the personal and business domains. In the business domain, users can send messages from their desktop phones, desktop computers, MICROSOFT TEAMS, SALESFORCE CRM, etc. Thus, the employees can message at their desk or on the go with mobile EUDs. Employees can efficiently send messages utilizing their computer keyboard by using Desktop or Microsoft Teams integrations.

It can thus be appreciated that the communications platform 402 also greatly facilitates seamlessly integrating CRM activities 410. CRM is typically used to refer to customer relationship management software that provides the ability to track each interaction that employees have with prospects or customers. This interaction can include activities such as sales calls, customer service interactions, marketing emails, strategic brainstorming among colleagues, and more. CRM tools can unify customer and company data from many sources and even use AI (artificial intelligence) to help better manage relationships across the entire customer lifecycle, spanning departments like marketing, sales, digital commerce, and customer service interactions. The communications platform 102 thus seamless integrates a variety of commercially available CRM systems such as SALESFORCE, MICROSOFT DYNAMICS 365, HUBSPOT, PIPEDRIVE, MONDAY SALES CRM, etc. Thus, regardless of the EUD utilized for CRM, embodiments of the communications platform 402 may enable the data to be accessible to any other EUD.

An ever-increasing focus in today's workplace stems around the phrase "enterprise collaboration". Enterprise collaboration is the process of helping diverse employees engage in teamwork across borders such that remote and local workers can participate in day-to-day tasks like file sharing, project management, and social media, all through one cohesive online system. With the influx of technology companies trying to create and market the "perfect enterprise collaboration" system, companies have acquired and adopted several solutions such as MICROSOFT TEAMS, SKYPE, ZOOM, etc. Another advantage of the communications platform 402 is the ability to seamlessly integrate various enterprise collaboration systems 412.

In addition to all the above, there are many additional industries that are classified as "data rich" industries, meaning that their day-to-day operations generate, collect, store, and depend on large amounts of data. Typically, this data needs to be reliably stored, securely protected and easily accessible by authorized EUDs. Advantageously, the embodiments of the communications platform 402 seamlessly integrate data rich industries 416, such as Electronic Health Records (EHR) in the health industry, banking and securities, media and entertainment, pharma and healthcare, education, manufacturing, insurance, transportation, government, energy and utilities, and retail and wholesale as non-limiting examples.

It should be understood by anyone in the industry, mobile messaging is a reality of doing business and it is going to be around for a long time. As such, it is imperative that companies give their employees a way to do business, easily and compliantly. The embodiments of the present invention provide technical solutions and platforms in which one or more of the afore-described advantages and aspects can be achieved.

The various embodiments of the communications platform provide the afore-described seamless integration through the use of a single number. In general, in one embodiment, each EUD that is serviced by the communications platform 102 is associated with a single unique number. That number is used in connection with all forms of communication with that EUD and the unique numbers can be tracked on behalf of various entities. For instance, on a personal level, a user may utilize 10 EUDs for various communication needs. The unique numbers associated with these EUDs all result in causing the telecommunications infrastructure to forward control of all such communications for these EUDs to the communications platform 402. At the communications platform 402, all these 10 unique numbers associated with the users 10 EUDs can be all tied together as being related to the same user. As such, the communications platform 402 can seamlessly integrate all communications associated with these EUDs.

In other embodiments, the EUDs owned or utilized by a particular entity may all include an identification number associated with that entity. As such, all communications that utilize that unique identification number can be seamlessly integrated by the communications platform 402.

In yet other embodiments, each of the EUDs may include unique identification numbers and the communications platform 402 can include various rules and categorizations to associate various unique identification numbers with various entities. For instance, Table 5 illustrates how a communications platform 402 could associate various unique identification numbers with various entities.

TABLE 5

| Unique ID Number | EUD | Associated with User A personal | Associated with User B personal | Associated with User A and B's employer |
|---|---|---|---|---|
| UIDN0001 | User A's BYOD phone | Yes | No | Yes |
| UIDN0002 | User B's BYOD phone | No | Yes | Yes |
| UIDN0003 | User A's ZOOM account | Yes | No | Yes |
| UIDN0004 | User A's FACEBOOK acct | Yes | No | No |

In this simplified example, the communications platform 402 associates User A's BYOD phone, User B's BYOD phone and User A's ZOOM account with the employer of User A and User B. In addition, User A's BYOD phone, User A's ZOOM account and User A's FACEBOOK account are all associated with User A personally. Likewise, User B's BYOD phone is personally associated with User B.

As such, in some embodiments, all EUDs associated with a user or an entity may utilize the same unique ID for that user or entity or, each EUD may have a unique ID and the communications platform 402 can associate one or more of the unique IDs with various users and/or entities. In the former case, communications associated with EUDs and identified by the unique IDs may also include further information to identify the identity of the type of EUD so that the communications platform can process the data appropriately (i.e., translate a FACEBOOK messenger such that it can be received by a WHATSAPP app).

Figure 5:
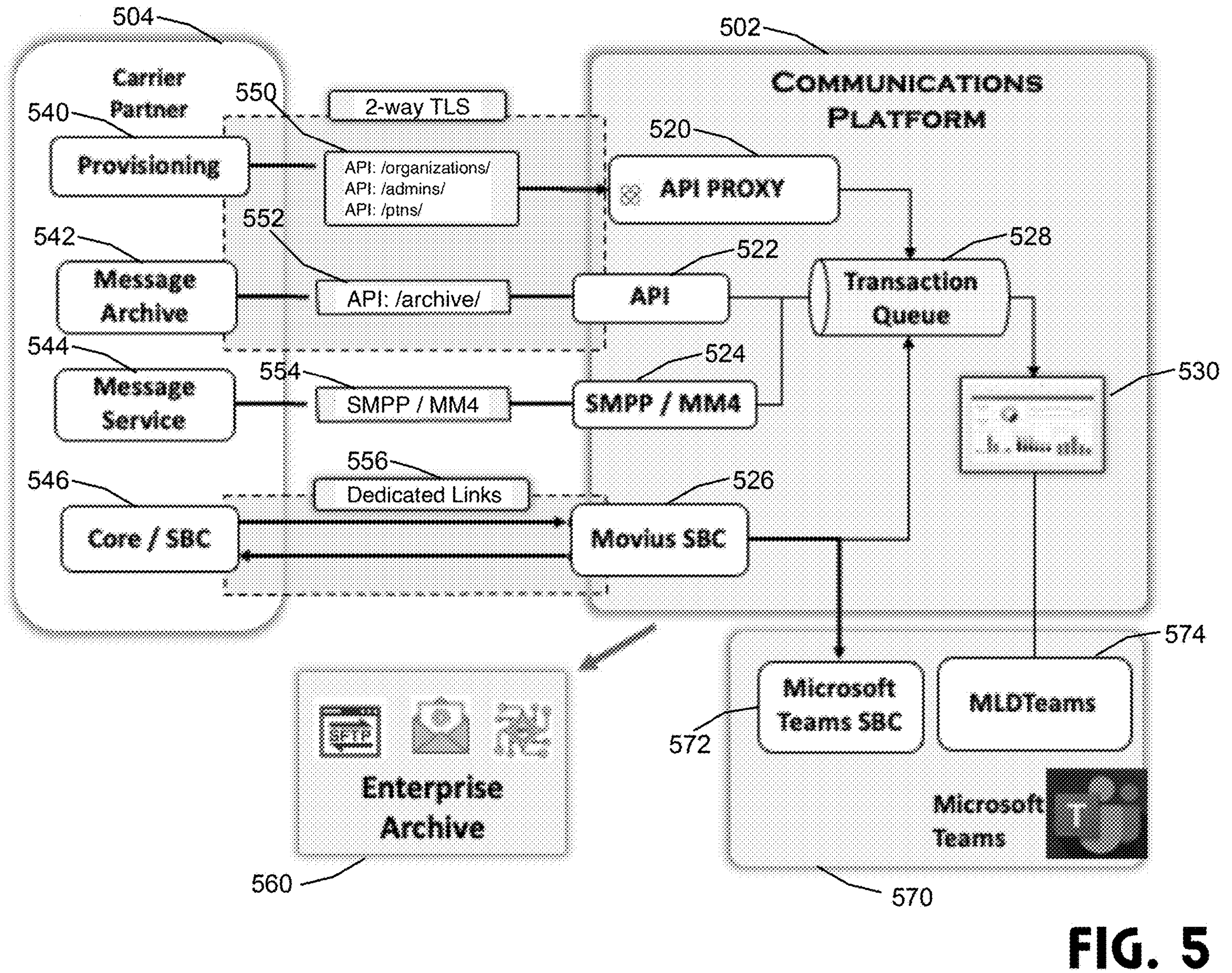
FIG. 5 is a functional block diagram illustrating the operation of an exemplary communications platform interacting with a carrier partner providing certain integrated communication services.

FIG. 5 is a functional block diagram illustrating the operation of an exemplary communications platform interacting with a carrier partner providing certain integrated communication services. The exemplary communications platform 502 is illustrated as interfacing with a carrier partner 504. It should be appreciated that the carrier partner 504 can be any participating carrier, such as brand name mobile provides (i.e., T-MOBILE) as well as small tier equipment lessees that also provide wireless service or any other communications or technology company that may be equipped to receive communication requests initiated by EUDs. Further, it should be understood, that while one carrier partner is illustrated in FIG. 5 multiple carrier partners may exist simultaneously and interface to the communications platform 502.

Initially the Carrier Partner 504 provisions the EUDs that are slated to receive or that are subscribed to the communications integration services provided through various embodiments of the present invention. As such, the Carrier Partner 504 operates initially to provision customers, admins, and lines. The Carrier Partner 504 provides the provisioning of the customers, admis, and lines by employment of a provisioning function 540 by the Carrier Partner 504 what interfaces with an API (Application Protocol Interface) proxy 520 provided by the communications platform 502 over one or more 2-way TLS communication channels.

TLS or Transport layer security is a cryptographic protocol that provides end-to-end security of data sent between applications over the Internet. TLS evolved from secure socket layers (SSL), which NETSCAPE COMMUNICATIONS CORPORATION developed in 1994 to secure web sessions.

TLS is normally implemented on top of transmission control protocol (TCP) in order to encrypt application layer protocols such as HTTP, file transfer protocol (FTP), simple mail transfer protocol (SMTP) and internet message application protocol (IMAP), although it can also be implemented on user datagram protocol (UDP), datagram congestion control protocol (DCCP) and stream control transmission protocol (SCTP), as well.

The Carrier Partner 504 operates to provision for the integrated communications service provided through the communications platform 502 for any form of EUD that is leveraging the service. In essence, during the provisioning process the Carrier Partner 504 receives a unique identifier that is associated with the EUD. The Carrier Partner 504 then associates that unique identifier with that particular EUD and tags the EUD and unique identifier as being services by the communications platform 502. As a result of the provisioning, any and all forms of communication that are directed through the Carrier Partner 504 and that include the unique ID, are captured by the Carrier Partner 504 and routed to the communications platform 502. Thus, any communications technology that the communications platform is servicing, such as calls, messages, delivery to CRM, video conferences, etc., are captured by the Carrier Partner 504 and once the unique identifier is recognized, the communications are routed to the communications platform 502. In the illustrated example, the provisioning by the Carrier Partner 504 can be accomplished by invoking one or more particular API proxy functions, such as the three listed in proxy function block 550, namely API:/organizations/, API:/admins/, and API:/ptns/.

One of the features or operations of the communications platform 502 is the provision and/or orchestration of archival services. The archival services can be provided by the communications platform 502 as messages or communications are received from the Carrier Partner 504 or directly by the communications platform 502. For communications received by the communications platform 502, the communications platform 502 may store directly into enterprise archive 560 or may send to a message archive 542 function provided by the Carrier Partner 504. For communications received by the Carrier Partner 504, the Carrier Partner 504 can either provide to the communications platform 502 for storage within the enterprise archive 560 by means of an API call 552 (i.e., API:/archive/) to the API 522 of the communications platform 502. Alternatively, the Carrier Partner may transmit the messages to be archived to the communications platform 502 by means of an SMPP transmission. Further, rather than sending messages to storage by the communications platform 502, the Carrier Partner 504 may archive the messages directly and simply forward notification of the same to the communications platform 502. Further, the Carrier Partner 504 may utilize a distributed archival system that can be accessed by other carrier partners and/or the communications platform 502. Further, in some embodiments, the Carrier Partner 504 and the communications platform 502 may maintained duplicate and redundant archives of all communications.

As previously described, one of the functions or features of the communications platform 502 is the ability to provide seamless integration of a wide variety of EUDs, and ultimately to be able to provide seamless integration to all EUDs. This is a very powerful and dynamic feature of the communications platform. In essence, the communications platform can be viewed as the communications unifier overcoming the inability to communicate across diverse channels and languages (or communication techniques protocols, etc.). This capability if provided through the communications platform 502, and in some circumstances with cooperation from the Carrier Partner 504. For instance, the communications platform 502 may directly receive, process and direct communications between EUDs, or may receive communications directed to the communications platform 502 from the Carrier Partner 504. In this latter scenario, a message service 244 of the Carrier Partner 504 receives messages that include the unique ID, then then invokes transmission or forward of the same to the communications platform by issuing an SMPP or MM4 transfer 554 through and SMPP/MM4 interface 524 of the communications platform 502. Likewise, the core/SBC function 546 of the Carrier Partner 504 can receive calls that are associated with the unique ID and then forward the calls to the communications platform 502 via dedicated links between the Carrier Partner 504 and the SBC 556 interface 526 of the communications platform 502. The dedicated lines 556 enable communications to be exchanged securely and reliably between the Carrier Partner 504 and the communications platform 502 with minimal latency.

An SBC (or session border controller) is a network element deployed to protect Session Initiation Protocol (SIP) based communications occurring over the Internet Protocol, such as voice over Internet Protocol (VOIP) as a non-limiting example. Early deployments of SBCs were focused on the borders between two service provider networks in a peering environment. This role has now expanded to include significant deployments between a service provider's access network and a backbone network to provide service to residential and/or enterprise customers.

The term "session" refers to a communication between two or more parties—in the context of telephony, this would be a call. Each call consists of one or more call signaling message exchanges that control the call, and one or more call media streams which carry the call's audio, video, or other data along with information of call statistics and quality. Together, these streams make up a session. It is the job of a session border controller to exert influence over the data flows of sessions.

The term "border" refers to a point of demarcation between one part of a network and another. As a simple example, at the edge of a corporate network, a firewall demarcates the local network (inside the corporation) from the rest of the Internet (outside the corporation). A more complex example is that of a large corporation where different departments have security needs for each location and perhaps for each kind of data. In this case, filtering routers or other network elements are used to control the flow of data streams. It is the job of a session border controller to assist policy administrators in managing the flow of session data across these borders.

The term "controller" refers to the influence that session border controllers have on the data streams that comprise sessions, as they traverse borders between one part of a network and another. Additionally, session border controllers often provide measurement, access control, and data conversion facilities for the calls they control.

SBCs commonly maintain full session state and offer the functions such as:

- security to protect the network and other devices from malicious attacks (i.e. denial of service), toll fraud via rogue media streams, malformed packet protection, and encryption of signaling and media;
- connectivity to allow different parts of the network to communicate through the use of a variety of techniques including NAT traversal, SIP normalization via SIP message and header manipulation, IPv4 to IPv6 interworking, VPN connectivity and Protocol translations between SIP, SIP-I, H.323;
- quality of service (QoS) policy of a network and prioritization of flows including traffic policing, resource allocation, rate limiting, call admission control, and ToS/DSCP bit setting;
- regulatory support such as emergency call prioritization and lawful interception;
- media services though built-in digital signal processors (DSPs) to enable them to offer border-based media control and services such as DTMF relay and interworking, media transcoding, tones and announcements, data and fax interworking, support for voice and video calls; and
- statistics and billing information because all sessions that pass through the edge of the network pass through the SBC, it is a natural point to gather statistics and usage-based information on these sessions.

SBCs are inserted into the signaling and/or media paths between calling and called parties (eg. Within a VoIP call), predominantly those using the Session Initiation Protocol (SIP), H.323, and MGCP call-signaling protocols.

In many cases the SBC hides the network topology and protects the service provider or enterprise packet networks. The SBC terminates an inbound call and initiates the second call leg to the destination party. The effect of this behavior is that not only the signaling traffic, but also the media traffic (voice, video) is controlled by the SBC. In cases where the SBC does not have the capability to provide media services, SBCs are also able to redirect media traffic to a different element elsewhere in the network, for recording, generation of music-on-hold, or other media-related purposes. Conversely, without an SBC, the media traffic travels directly between the endpoints, without the in-network call signaling elements having control over their path.

In other cases, the SBC simply modifies the stream of call control (signaling) data involved in each call, perhaps limiting the kinds of calls that can be conducted, changing the codec choices, and so on. Ultimately, SBCs allow the network operators to manage the calls that are made on their networks, fix or change protocols and protocol syntax to achieve interoperability, and also overcome some of the problems that firewalls and network address translators (NATs) present for VOIP calls.

To show the operation of an SBC, one can compare a simple call establishment sequence with a call establishment sequence with an SBC. In the simplest session establishment sequence with only one proxy between the user agents the proxy's task is to identify the callee's location and forward the request to it. The proxy also adds a Via header with its own address to indicate the path that the response should traverse. The proxy does not change any dialog identification information present in the message such as the tag in the From header, the Call-Id or the Cseq. Proxies also do not alter any information in the SIP message bodies. Note that during the session initiation phase the user agents exchange SIP messages with the SDP bodies that include addresses at which the agents expect the media traffic. After successfully finishing the session initiation phase the user agents can exchange the media traffic directly between each other without the involvement of the proxy.

SBCs are designed for many applications and are used by operators and enterprises to achieve a variety of goals. Even the same SBC implementation might act differently depending on its configuration and the use case. Hence, it is not easily possible to describe an exact SBC behavior that would apply to all SBC implementations. In general, it is possible to identify certain features that are common to SBCs. For example, most SBCs are implemented as back-to-back user agent. A proxy-like server can split an SIP transaction in two call legs: on the side facing the user agent client (UAC), it acts as server, on the side facing user agent server (UAS) it acts as a client. While a proxy usually keeps only state information related to active transactions, it may keep state information about active dialogs, e.g., calls. That is, once a proxy receives a SIP request it will save some state information. Once the transaction is over, e.g., after receiving a response, the state information will soon after be deleted. The state information may be maintained for active calls and only deleted once the call is terminated.

When an SBC is included in the call path, the SBC operates as a user agent server towards the caller and as user agent client towards the callee. In this sense, the SBC actually terminates that call that was generated by the caller and starts a new call towards the callee. The INVITE message sent by the SBC no longer may contain a clear reference to the caller. The INVITE sent by the SBC to the proxy includes Via and Contact headers that point to the SBC itself and not the caller. SBCs often also manipulate the dialog identification information listed in the Call-Id and From tag. Further, in case the SBC is configured to also control the media traffic then the SBC also changes the media addressing information included in the c and m lines of the SDP body. Thereby, not only will all SIP messages traverse the SBC but also all audio and video packets. As the INVITE sent by the SBC establishes a new dialog, the SBC also manipulates the message sequence number (CSeq) as well the Max-Forwards value. Note that the list of header manipulations listed here is only a subset of the possible changes that an SBC might introduce to a SIP message. Furthermore, some SBCs might not do all of the listed manipulations. If the SBC is not expected to control the media traffic then there might be no need to change anything in the SDP body. Some SBCs do not change the dialog identification information and others might even not change the addressing information.

SBCs are often used by corporations along with firewalls and intrusion prevention systems (IPS) to enable calls (eg., VoIP calls) to and from a protected enterprise network. Call service providers use SBCs to allow the use of particular protocols from private networks with Internet connections using NAT, and also to implement strong security measures that are necessary to maintain a high quality of service. SBCs also replace the function of application-level gateways. In larger enterprises, SBCs can also be used in conjunction with SIP trunks to provide call control and make routing/policy decisions on how calls are routed through the LAN/WAN. There are often tremendous cost savings associated with routing traffic through the internal IP networks of an enterprise, rather than routing calls through a traditional circuit-switched phone network.

Additionally, some SBCs can allow calls to be set up between two phones using different signaling protocols (e.g., SIP, H.323, Megaco/MGCP) as well as performing transcoding of the media stream when different codecs are in use. Most SBCs also provide firewall features for call traffic (denial of service protection, call filtering, bandwidth management). Protocol normalization and header manipulation is also commonly provided by SBCs, enabling communication between different vendors and networks.

In the illustrated example of FIG. 5, the communications platform 502 is shown as interfacing with Microsoft Teams 570. It will be appreciated that the exemplary architecture and interface with any of a wide variety of applications and/or EUDs such as Microsoft Teams and the use of Microsoft Teams is simply provided as an example. The communications platform 101 interfaces to a Microsoft Teams SBC 572 for voice and/or video content while messages and data can be provided through an MLDTeams application 574. Messages received from the Carrier Partner 504 are placed into a transaction queue 528 and the content 530 can then be transferred to Microsoft Teams 570 via the MLDTeams interface 574.

The architecture illustrated in FIG. 5 also enables FCC compliance, Legal Intercept Compliance, and Emergency Communications Compliance.

Figure 6:
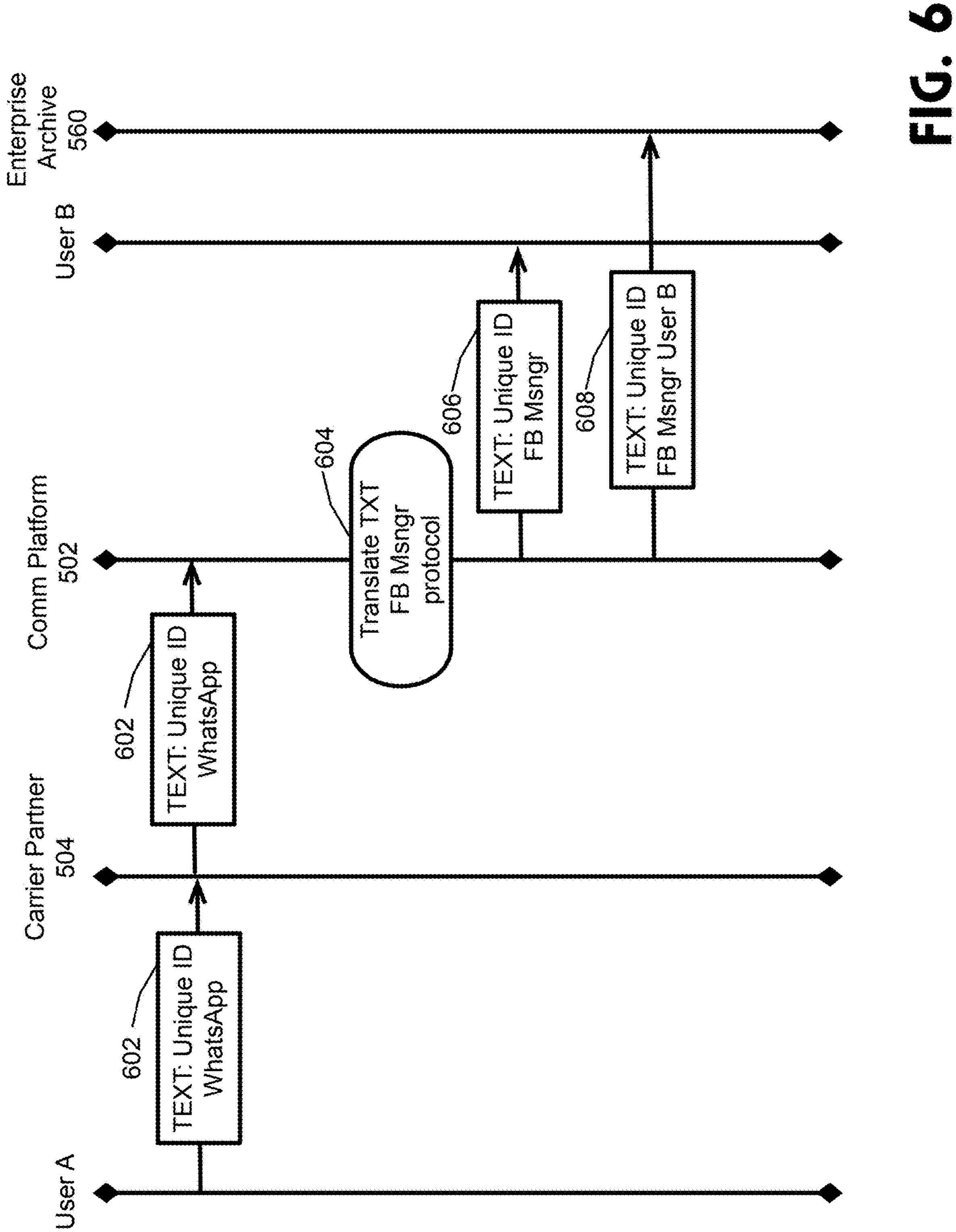
FIG. 6 is a flow diagram illustrating a first communication exchange example based on an exemplary architecture such as that illustrated in FIG. 5 as a non-limiting example.

A few practical examples of the operation of the architecture illustrated in FIG. 5 are presented. FIG. 6 is a flow diagram illustrating a first communication exchange example based on an exemplary architecture such as that illustrated in FIG. 5 as a non-limiting example. In this example, assume that User A utilizes WHATSAPP to talk with User B who uses FB Messenger and that User B is utilizing an EUD that subscribe to the integrated communications service provide by the communications platform 502. Initially, User A sends a text 602 to User B, the text includes the destination of User B. The Carrier Partner 504 sees the User B destination and determines that it is to be processed by the communications platform 502. As such, the Carrier Partner 504 forwards the message 602 to communications platform 502. The communications platform then identifies the destination of the message and determines that the message is directed to a particular EUD with a particular unique ID and that has a preference known to the communications platform 502 of using FACEBOOK MESSENGER for exchanging of texts messages. The communications platform 502 then performs a protocol translation of the message from WHATSAPP to FACEBOOK MESSENGER 604 and forwards the message to the intended destination 606—User B. The communications platform 502 may also record the message into the Enterprise Archive 560 for User B in FACEBOOK MESSENGER format 608 tied to the unique ID.

Figure 7:
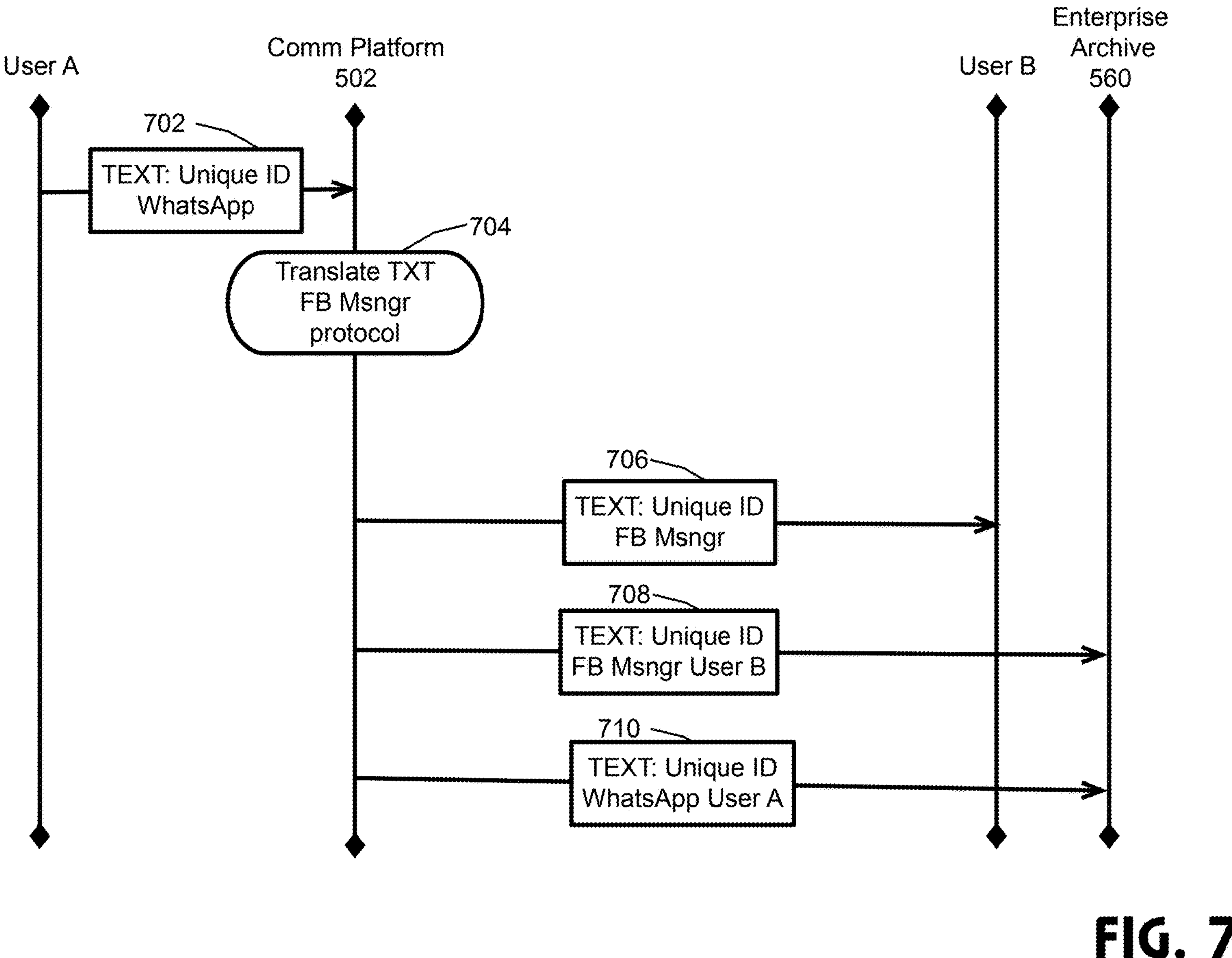
FIG. 7 is a flow diagram illustrating a communication exchange example based on an exemplary architecture such as that illustrated in FIG. 5.

FIG. 7 is a flow diagram illustrating a communication exchange example based on an exemplary architecture such as that illustrated in FIG. 5. In this example, assume that User A utilizes WhatsApp to talk with User B who uses FB Messenger and that both User A and User B are utilizing EUDs that subscribe to the integrated communications service provide by the communications platform 502. Initially, User A sends a text 702 to User B, the text includes the unique ID of User A and the destination of User B. The text 702 is received by the communications platform 502. The communications platform 502 then identifies the destination of the message and determines that the message is directed to a particular EUD what has a preference of using FACEBOOK MESSENGER for exchanging of texts messages. The communications platform 502 then performs a protocol translation of the message from WHATSAPP to FACEBOOK MESSENGER 404 and forwards the message to the intended destination 706—User B using the unique ID of User B. Communications platform 502 may employ the multiline/multichannel technology presented in U.S. Pat. Nos. 11,563,711 and/or 9,332,128 (both of which are incorporated herein above by reference) in sending the communications between User A and User B. The communications platform 502 may also record the message into the Enterprise Archive 560 for User B in FACEBOOK MESSENGER format 708 and User A in WHATSAPP format 710.

Figure 8:
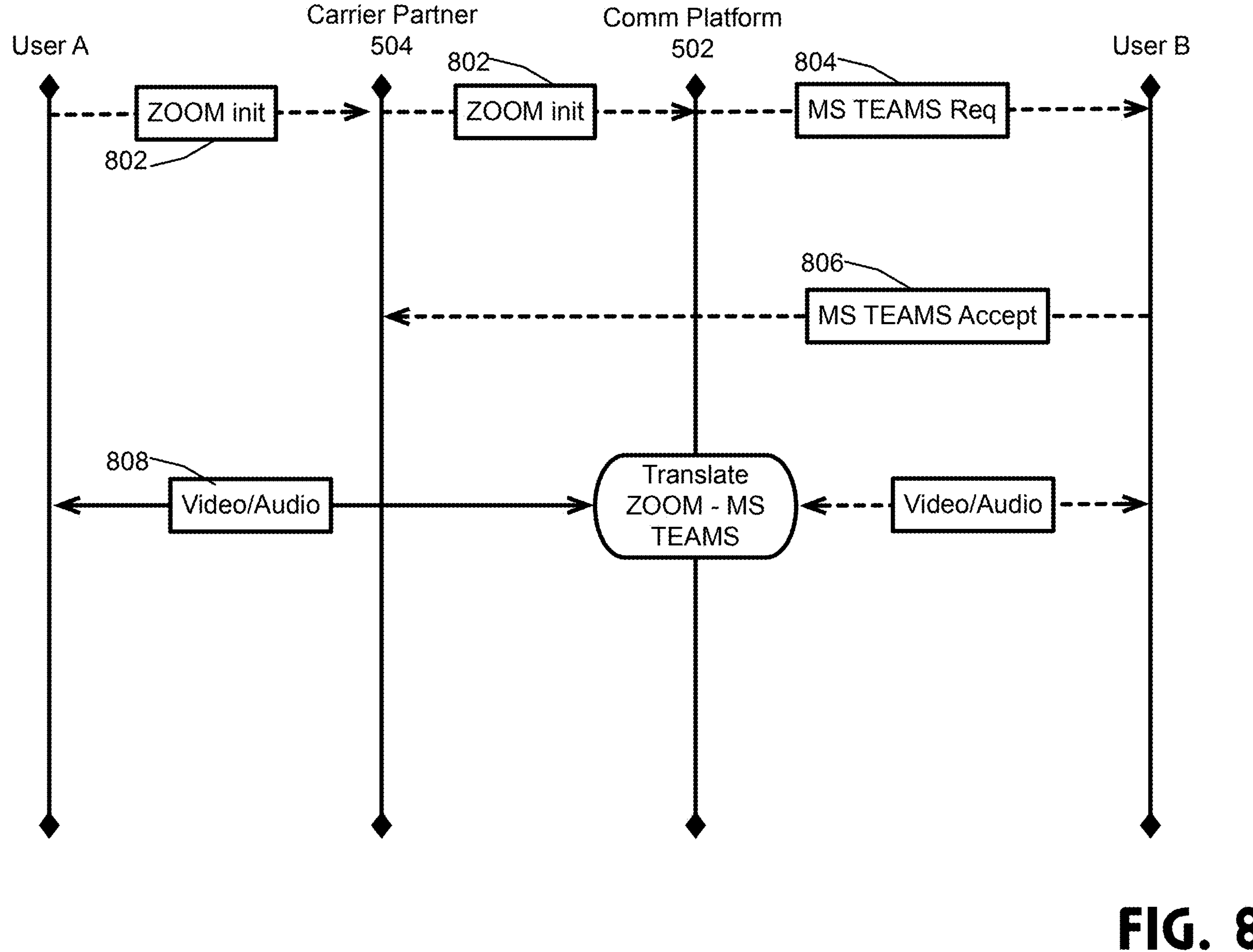
FIG. 8 is a flow diagram illustrating another communication exchange example based on an exemplary architecture such as that illustrated in FIG. 5.

FIG. 8 is a flow diagram illustrating another communication exchange example based on an exemplary architecture such as that illustrated in FIG. 5. User A and User B enter a video conference with User A using ZOOM and User B using MICROSOFT TEAMS. The video conference is initially set up with User A initiating the conference with User B 802. During the setup process, the Carrier Partner 504 detects the unique ID of User A in setting up the conference call and forwards the setup request to the communication platform 502 to be processed. The communication platform 502 recognizes the unique ID for User A and the unique ID of User B and thus identifies both as subscribers to the service. The communication platform 502 then identifies that User B prefers MICROSOFT TEAMS and that User A prefers to use ZOOM. The communications platform 502 then sends an MS TEAMS request 804 to User B. Upon receiving an MS TEAMS accept 806 from User B the communication platform 502 completes the video call connection between User A and User B. Video and Audio between User A and the communication platform is in the ZOOM format and between the communication platform 502 and User B is in MICROSOFT TEAMS format 810. The communication platform 502 performs the translations as well as providing translations for messages transmitted between the two users, archived deposits, etc.

Thus, it should be appreciated that call or message communication happens through a carrier powered endpoint (mobile phone, tablet, connected device) and then that call arrives to the communication platform with a single unique identity. With that single unique identity, the communication platform can do several things using the multiline/multichannel technology presented in U.S. Pat. No. 9,332,128 for delivery to different end points (CRM, ZOOM, TEAMS, Messaging systems) and also to get the carrier to terminate as needed and appropriate.

What is important to various embodiments of the present invention is the provision of the single unique identifier from the EUD to invoke the provision of the integrated communication services by the communication platform. The single unique identifier is provided in various manners dependent upon the technology or protocol being employed during the communication setup. In general, it will be understood that the integrated communication services can be accessed by any EUD that is provisioned to operate over a carrier network or, any application or system that operates on such an EUD. As those skilled in the art will understand, a carrier provisioned EUD will include a Subscriber Identity Module ("SIM") card or an Embedded Subscriber Identity Module ("ESIM"). The SIM card or ESIM is provisioned by the carrier and is unique to the EUD. When the EUD is utilized to set up a communication, such as placing a call, sending a text, sending and SMS, MMS, establishing a video conference, etc., the EUD must first transmit a setup request and that request will include the single unique identifier associated with the EUD or user of the EUD. The single unique identifier may be provisioned to the EUD by the operator of the communication platform or may be provisioned by the carrier in response to the operator of the EUD requesting such provisioning.

Under each of the cellular protocols, during a call setup request, the EUD transmits identifying information as to the originating party or unit. This is most typically in the form of calling line identifier ("CLID"); however, it should be appreciated that many protocols include additional space above and beyond just space in the protocol for the 10-digit phone number associated with the initiating device. As such, during a typical call setup, the EUD may provide the mobile identification number ("MIN"), unique SIM information, the network number that the EUD is provisioned with, as well as additional unique identification information. This information is provisioned into the EUD device by a carrier partner when the user is subscribing to the integrated communication services. This single unique identification number is provided to the carrier operator during all communication set up initiations and, the carrier operator receives the single unique identification number and forwards the communication setup request to the communications platform for processing as described above.

Certain actions or blocks in the processes or process flows described in this specification naturally precede others for the embodiment to function as described. However, the various embodiments are not limited to the order of the actions or blocks as presented or described. That is, it is recognized that some actions or blocks may be performed before, after, or in parallel (substantially simultaneously with) other actions or blocks without departing from the scope and spirit of the various embodiments. In some embodiments, certain actions or blocks may be omitted or not performed as not all embodiments necessarily must implement all of the described actions. Also, in some embodiments, multiple actions depicted and described as unique actions or blocks in the present disclosure may be comprised within a single step or block. Further, words such as "thereafter", "then", "next", "subsequently", etc. are not intended to limit the order of the actions or blocks. These words are simply used to guide the reader through the description of the exemplary method.

Additionally, one of ordinary skill in programming will be able to write computer code or identify appropriate hardware and/or circuits to implement the various embodiments, as well as features and aspects thereof, based on the flow charts and associated description in this specification. Therefore, disclosure of a particular set of program code instructions or detailed hardware devices is not considered necessary for an adequate understanding of how to make and use the various embodiments. The functionality of the claimed computer implemented processes is explained in more detail in the above description and in conjunction with the Figures that may illustrate various process flows.

Based on all of the above, as those of ordinary skill in the art would understand, under existing traditional technology the network services and identifiers have remained siloed and network specific, they were not unique across ecosystems. The uniqueness e of various embodiments of the present invention utilize a single identifier (an MSISDN, a SIM, an ESIM, or a uniquely asserted self-sovereign identity) to now bring all channels of communication and fragmented technologies together. Similar to the reversal of the Tower of Babel or, the user of a Babel Fish in the ear as presented in Hitch Hikers Guide to the Galaxy.

Figure 9:
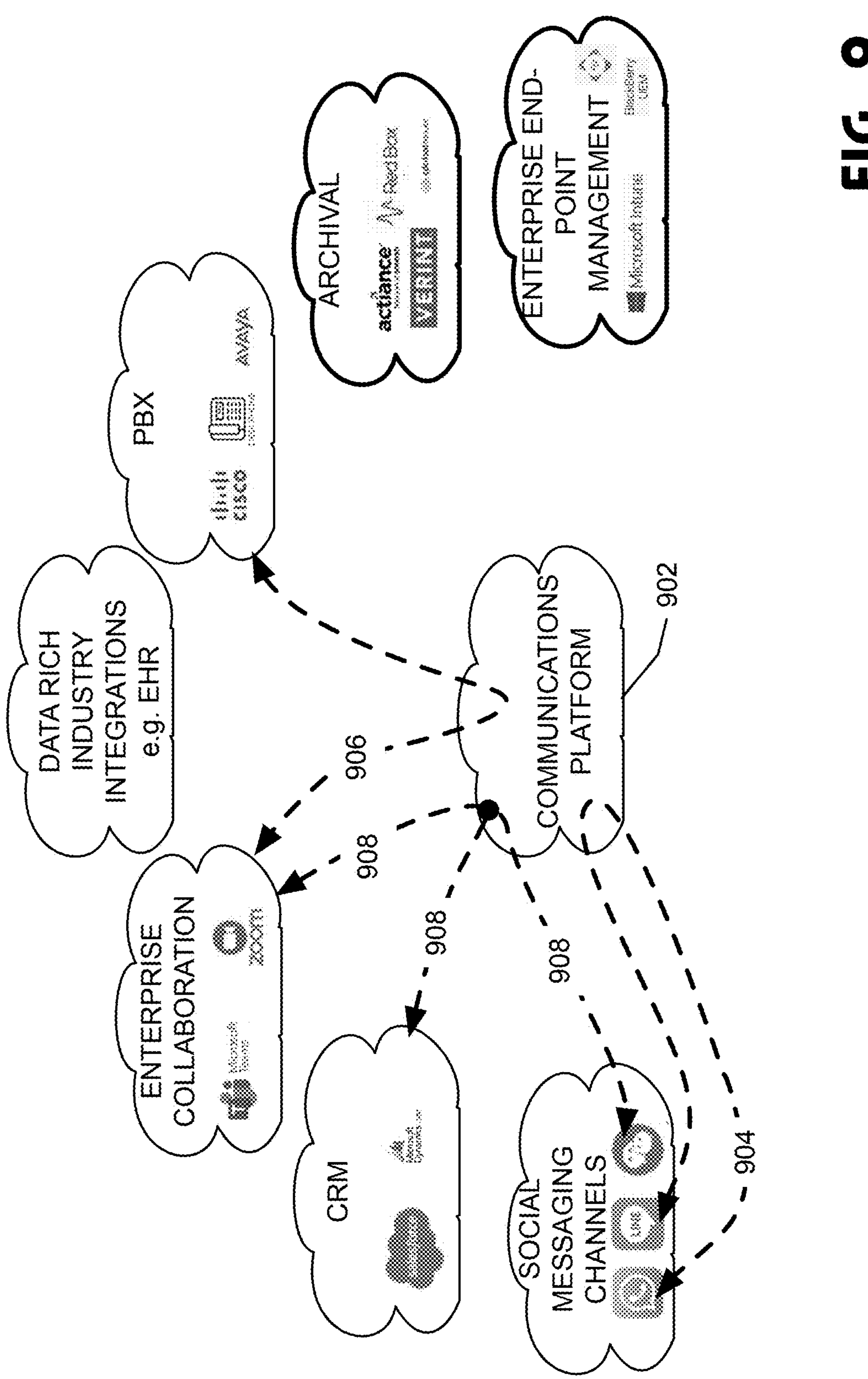
FIG. 9 is a sky of clouds illustrating the overall operation of an embodiment of an exemplary communications platform 902.

FIG. 9 is a sky of clouds illustrating the overall operation of an embodiment of an exemplary communications platform 902. The communications platform operates as the Babel Fish and enables communication between all of the various platforms, technologies, communications channels, terminal devices, communication applications, etc. A single unique identity is provided for each user, or each position, etc. This single unique identity is what the communications platform 902 utilizes to recognize a communications initiator and a communications recipient.

The communications platform 902 is shown as effectively operating in the middle of a complex orchestration of communication. A few scenarios are illustrated in FIG. 9. For instance, communication session 904 is between a first EUD using the WHATSAPP application and another EUD using the LINE messaging app. In this scenario, assume the communication was initiated by the user of the WHATSAPP application. That user initiates a connection to the user of the LINE messaging app. The communications platform 902 receives the communication initiation, either directly or as being recognized by the communications infrastructure (i.e. PSTN, MTN, etc), and recognizes the unique identification of the initiating EUD. The communications platform 902 also recognizes the destination and the unique identifier associated with the destination EUD. The communications platform 902 thus knows that the initiating EUD is communicating with the WHATSAPP application and the receiving EUD is communicating with the LINE messaging application. The communications platform 902 can perform any necessary translations on the communication between the two EUDs and store a history of the communications session into the archives for both EUDs.

As another example, communication session 906 is between an initiating EUD utilizing a ZOOM connection and receiving EUD utilizing a PBX connection. The communications platform 902 receives the communication initiation from the initiating EUD and recognizes the unique identifier associated therewith. The communications platform 902 also recognizes the unique identifier of the receiving EUD. The communications platform 902 operates as a bridge to enable these two disparate communications technologies to actually be engaged in a communications session. The communications platform 902 receives voice communications from the ZOOM app and converts it as necessary to send to the PBX and vice versa. The communications platform 902 is aware that the PBX cannot provide video or process video and as such, simply obtains and provides the voice communications from the ZOOM app. The communications platform 902 can also provide an indicator that the receiving EUD is not video capable by providing such information as a ZOOM avatar for the receiving EUD.

As another example, communication session 908 illustrates a one-to-many communications session established by a messaging app EUD with a MICROSOFT TEAMS EUD and a MICROSOFT DYNAMICS CRM EUD. Similarly, the communications platform recognizes the unique identifiers, identifies a language or protocol that can I be spoken to each EUD and coordinates the communication session.

Thus, it should be appreciated that the communications platform 902, utilizing the single unique identifiers for each EUD, can establish a communications session between any technology and breaks down the silos imposed by current state of the art technology.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, acoustic and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Figure 10:
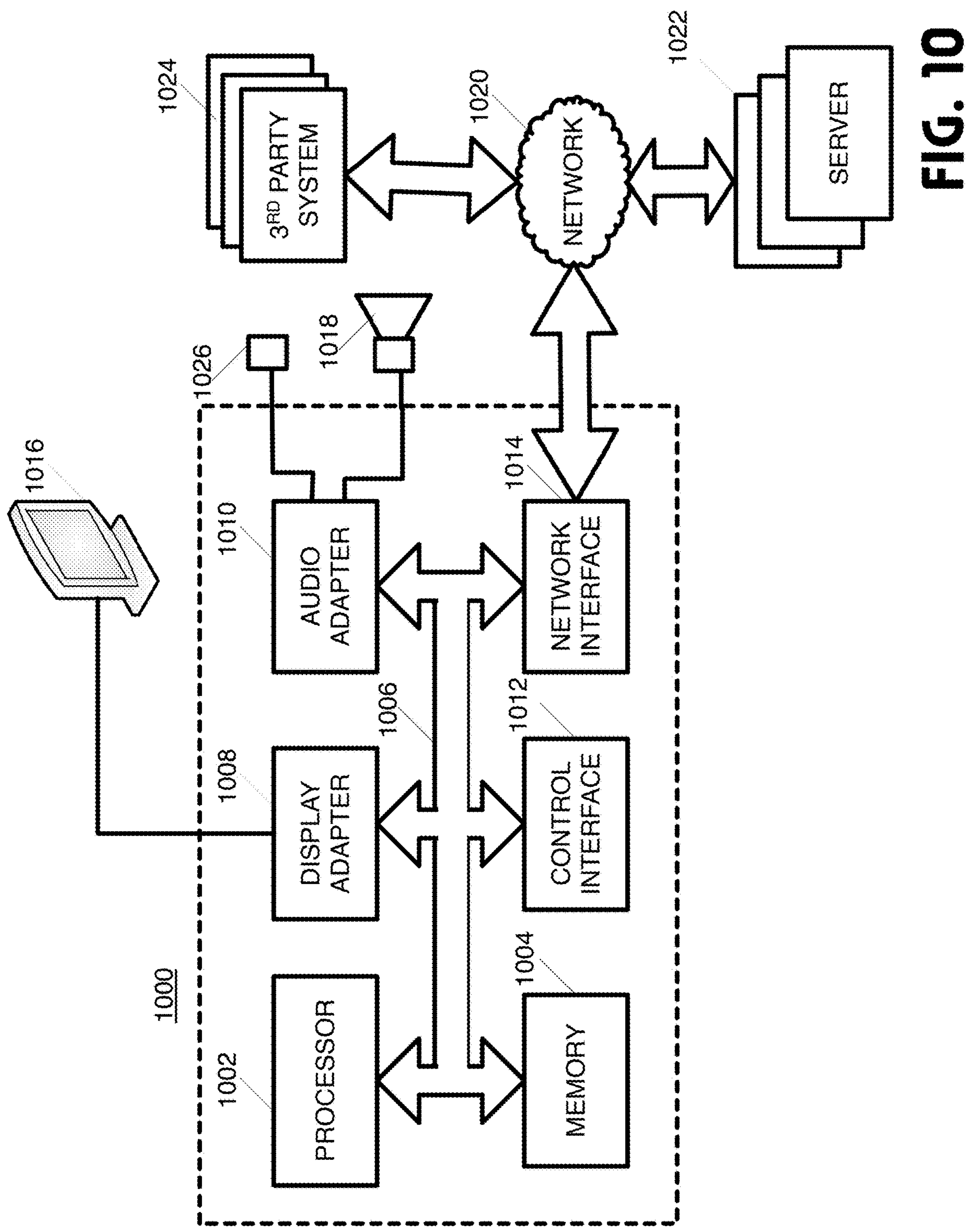
FIG. 10 is a functional block diagram of the components of an exemplary embodiment of system or sub-system operating as a controller or processor 1000 that could be used in various embodiments of the disclosure for controlling aspects of the various embodiments.

FIG. 10 is a functional block diagram of the components of an exemplary embodiment of system or sub-system operating as a controller or processor 1000 that could be used in various embodiments of the disclosure for controlling aspects of the various embodiments. It will be appreciated that not all of the components illustrated in FIG. 10 are required in all embodiments of the activity monitor but, each of the components are presented and described in conjunction with FIG. 10 to provide a complete and overall understanding of the components. The controller can include a general computing platform 1000 illustrated as including a processor/memory device 1002/1004 that may be integrated with each other or, communicatively connected over a bus or similar interface 1006. The processor 1002 can be a variety of processor types including microprocessors, micro-controllers, programmable arrays, custom IC's etc. and may also include single or multiple processors with or without accelerators or the like. The memory element of 1004 may include a variety of structures, including but not limited to RAM, ROM, magnetic media, optical media, bubble memory, FLASH memory, EPROM, EEPROM, etc. The processor 1002, or other components in the controller may also provide components such as a real-time clock, analog to digital convertors, digital to analog convertors, etc. The processor 1002 also interfaces to a variety of elements including a control interface 1012, a display adapter 1008, an audio adapter 1010, and network/device interface 1014. The control interface 1012 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 1008 can be used to drive a variety of alert elements 1016, such as display devices including an LED display, LCD display, one or more LEDs or other display devices. The audio adapter 1010 interfaces to and drives another alert element 1018, such as a speaker or speaker system, buzzer, bell, etc. The network/interface 1014 may interface to a network 1020 which may be any type of network including, but not limited to the Internet, a global network, a wide area network, a local area network, a wired network, a wireless network or any other network type including hybrids. Through the network 1020, or even directly, the controller 1000 can interface to other devices or computing platforms such as one or more servers 1022 and/or third-party systems 1024. A battery or power source provides power for the controller 1000. Therefore, although selected aspects have been illustrated and described in detail, it will be understood that various substitutions and alterations may be made therein without departing from the spirit and scope of the present invention, as defined by the following claims.

What is claimed is:

1. A method for providing authentication for communication across multiple channel types, the method comprising the actions of:

receiving at a multi-channel authenticator splitter (MCAS), a one-time password (OTP) from a first user seeking to authenticate with a second user, the OTP comprising a message content, a sending channel identification and a receiving channel identification;

the MCAS splitting the OPT OTP into portions and transmitting the portions of the OTP across a sequence of channels to the second user;

the second user assembling the received portions of the OTP received and assembling the portions of the OTP to obtain the complete OTP;

the second user, in response to obtaining the complete OTP, sending a response to a mobile authenticator validator (MCAV) to validate the complete OTP;

upon validation, a unified communication platform (UCP), communicatively coupled to the MCAS and MCAV, performing the actions of:

establishing a communication channel between the first user and the second user; subsequently to establishing the communication channel:

in response to receiving a communication transmission from an originator directed towards a recipient, if the received communication transmission originator is the first user and the recipient is the second user, the UCP creating a translated communication by performing any conversion necessary for the second user to understand the communication transmission from the first user;

if the received communication transmission originator is the second user and the recipient is the first user, the UCP creating a translated communication by performing any conversion necessary for the first user to understand the communication transmission from the second user; and the UCP routing the translated communication between the first user and the second user.

2. The method of claim 1, wherein the MCAS splitting the OTP and transmitting the portions of the OTP across the sequence of channels further comprises the MCAS receiving a specified sequence of channels from the first user.

3. The method of claim 1, wherein the MCAS splitting the OTP and transmitting the portions of the OTP across the sequence of channels further comprises the MCAS using a randomizer to choose the sequence of channels.

4. The method of claim 1, wherein the MCAS splitting the OTP and transmitting the portions of the OTP across the sequence of channels further comprises the MCAS receiving a subset of channels from the first user.

5. The method of claim 1, wherein the UCP parses the received communication transmission and recognizes if the received communication transmission is to be serviced by the UCP.

6. The method of claim 5, wherein the action of the UCP establishing a communication channel between the first user and the second user comprises establishing a first leg of the communication channel between the UCP and the second user and establishing a second leg of the communication channel between the UCP and the first user.

7. The method of claim 6, wherein the action of establishing the first leg of the communication channel between the UCP and the second user comprises using a telecommunications technology compatible with the second user.

8. The method of claim 6, wherein the action establishing the second leg of the communication channel between the UCP and the first user comprises using a telecommunications technology compatible with the first user.

9. The method of claim 4, further comprising the UCP entering the received communication transmission into an archive for the originating user.

* * * * *